(12) United States Patent
Galstian et al.

(10) Patent No.: US 9,612,504 B2
(45) Date of Patent: *Apr. 4, 2017

(54) CAPACITIVELY COUPLED ELECTRIC FIELD CONTROL DEVICE

(71) Applicant: LENSVECTOR INC., Sunnyvale, CA (US)

(72) Inventors: Tigran Galstian, Québec (CA); Vladimir Presniakov, Québec (CA); Karen Asatryan, Québec (CA); Amir Tork, Québec (CA); Armen Zohrabyan, Québec (CA); Aram Bagramyan, Québec (CA); Simon Careau, Québec (CA)

(73) Assignee: LENSVECTOR INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/441,452

(22) PCT Filed: Nov. 12, 2013

(86) PCT No.: PCT/CA2013/050862
§ 371 (c)(1),
(2) Date: May 7, 2015

(87) PCT Pub. No.: WO2014/071530
PCT Pub. Date: May 15, 2014

(65) Prior Publication Data
US 2015/0301427 A1    Oct. 22, 2015

Related U.S. Application Data

(60) Provisional application No. 61/725,021, filed on Nov. 11, 2012.

(51) Int. Cl.
*G02F 1/29* (2006.01)
*G02B 27/64* (2006.01)
(Continued)

(52) U.S. Cl.
CPC ............. *G02F 1/29* (2013.01); *G02B 27/646* (2013.01); *G02F 1/13306* (2013.01);
(Continued)

(58) Field of Classification Search
CPC ............... G02F 2001/134354; G02F 2001/294
See application file for complete search history.

(56) References Cited

U.S. PATENT DOCUMENTS 4,784,161 A    11/1988    Skalsky et al.
5,212,583 A     5/1993    Vali et al.
(Continued)

FOREIGN PATENT DOCUMENTS

GB    2 240 721 A    8/1991
JP    2006-313243    * 11/2006    ............... G02F 1/13
(Continued)

OTHER PUBLICATIONS

International Search Report mailed Feb. 14, 2014, in corresponding International Patent Application No. PCT/CA2013/050862.
(Continued)

*Primary Examiner* — Sang V Nguyen
(74) *Attorney, Agent, or Firm* — Arent Fox LLP

(57) ABSTRACT

A spatially non-uniform electrode structure is proposed for controlling a spatially non-uniform electric field driving a tunable liquid crystal lens. The spatially non-uniform electrode structure enables the generation of a predetermined spatially non-uniform electric field profile where complex capacitive coupling between multiple different electrically floating neighboring electrode segments is employed for the generation of the electrical field of desired form by supply-
(Continued)

ing an initial electric potential to a limited number of electrodes.

48 Claims, 38 Drawing Sheets

(51) Int. Cl.
*G02F 1/133* (2006.01)
*G02F 1/1333* (2006.01)
*G02F 1/1343* (2006.01)
*G02F 1/1347* (2006.01)

(52) U.S. Cl.
CPC .... *G02F 1/13471* (2013.01); *G02F 1/133345* (2013.01); *G02F 1/134309* (2013.01); *G02F 2001/134354* (2013.01); *G02F 2001/294* (2013.01); *G02F 2201/128* (2013.01)

(56) References Cited

U.S. PATENT DOCUMENTS

| | | | | |
|---|---|---|---|---|
| 6,825,909 B2* | 11/2004 | Walker | ............... | G02F 1/1339 349/123 |
| 8,216,309 B2* | 7/2012 | Azar | ............... | A61F 2/147 623/6.13 |
| 9,201,285 B2* | 12/2015 | Galstian | ............... | G02F 1/29 |
| 2004/0169630 A1 | 9/2004 | Ide | | |
| 2006/0164593 A1* | 7/2006 | Peyghambarian | ............... | G02F 1/29 349/200 |
| 2009/0237575 A1* | 9/2009 | Tsi-shi | ............... | G02B 3/14 349/1 |
| 2009/0316097 A1* | 12/2009 | Presniakov | ............... | G02F 1/29 349/129 |
| 2010/0045180 A1* | 2/2010 | Seelhammer | ............... | G02F 1/134309 313/509 |
| 2010/0302490 A1 | 12/2010 | Chiu | | |
| 2011/0090415 A1* | 4/2011 | Asatryan | ............... | G02F 1/1337 349/33 |
| 2011/0216257 A1* | 9/2011 | Galstian | ............... | C08J 3/28 349/33 |
| 2012/0162592 A1* | 6/2012 | Takagi | ............... | G02B 27/2214 349/139 |
| 2012/0188490 A1* | 7/2012 | Zohrabyan | ............... | G02F 1/134309 349/96 |
| 2012/0257131 A1* | 10/2012 | Galstian | ............... | G02F 1/134309 349/36 |

FOREIGN PATENT DOCUMENTS

| | | |
|---|---|---|
| WO | WO 2009/153764 A2 | 12/2009 |
| WO | WO 2012/079178 A1 | 6/2012 |

OTHER PUBLICATIONS

PCT/CA2013/050862 International preliminary report on patentability dated May 12, 2015.
PCT/CA2013/050862 PCT search strategy.
Extended European Search Report of European Patent Application No. 13852740.3 dated Mar. 29, 2016.

* cited by examiner

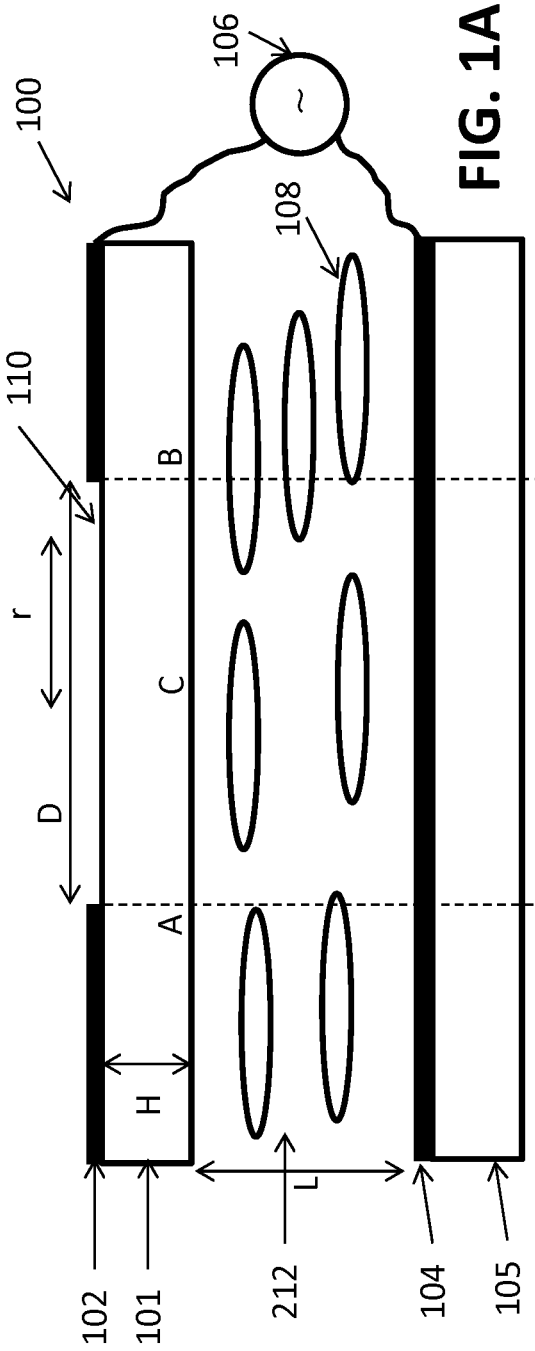
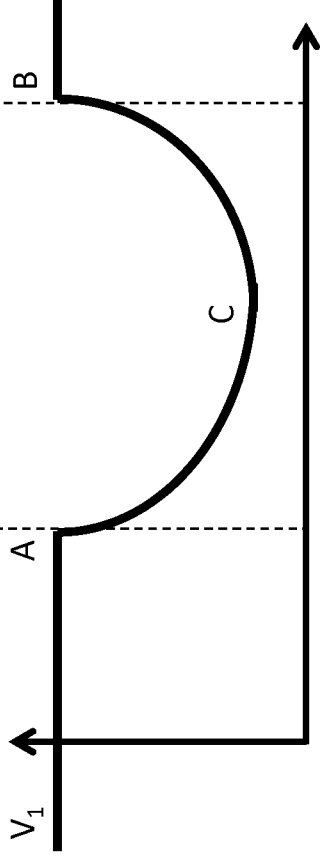
FIG. 1A
PRIOR ART
FIG. 1B
PRIOR ART

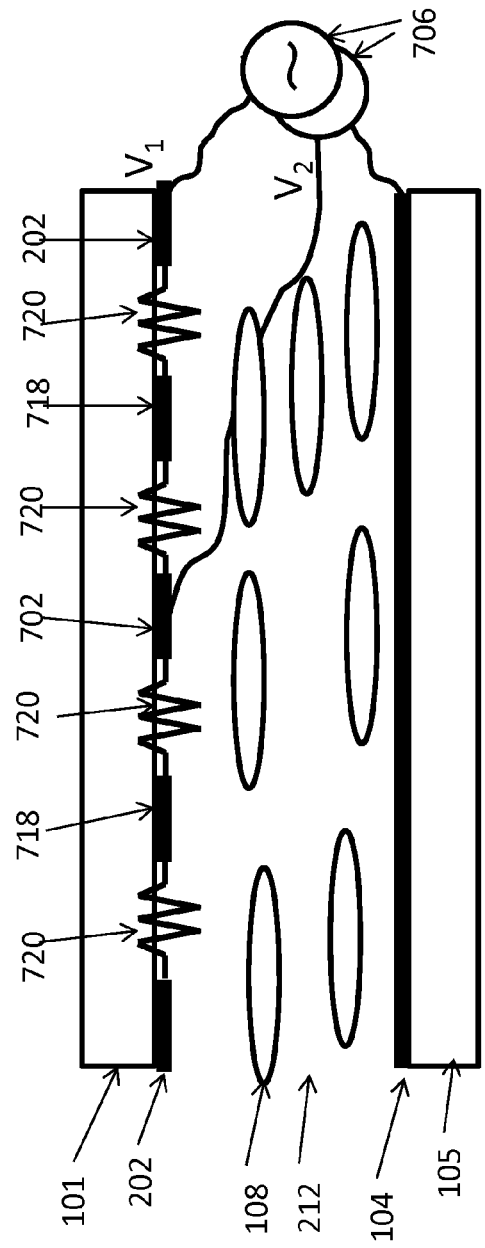
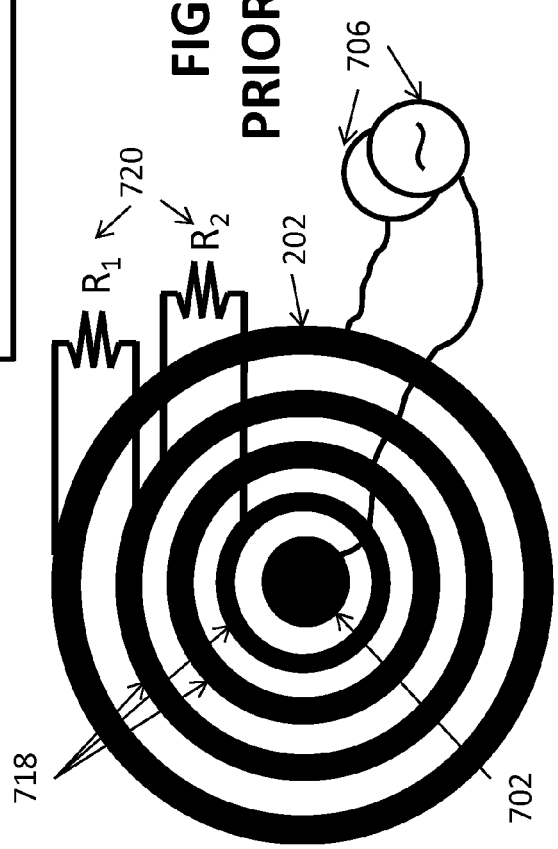
FIG. 7
PRIOR ART
FIG. 8
PRIOR ART

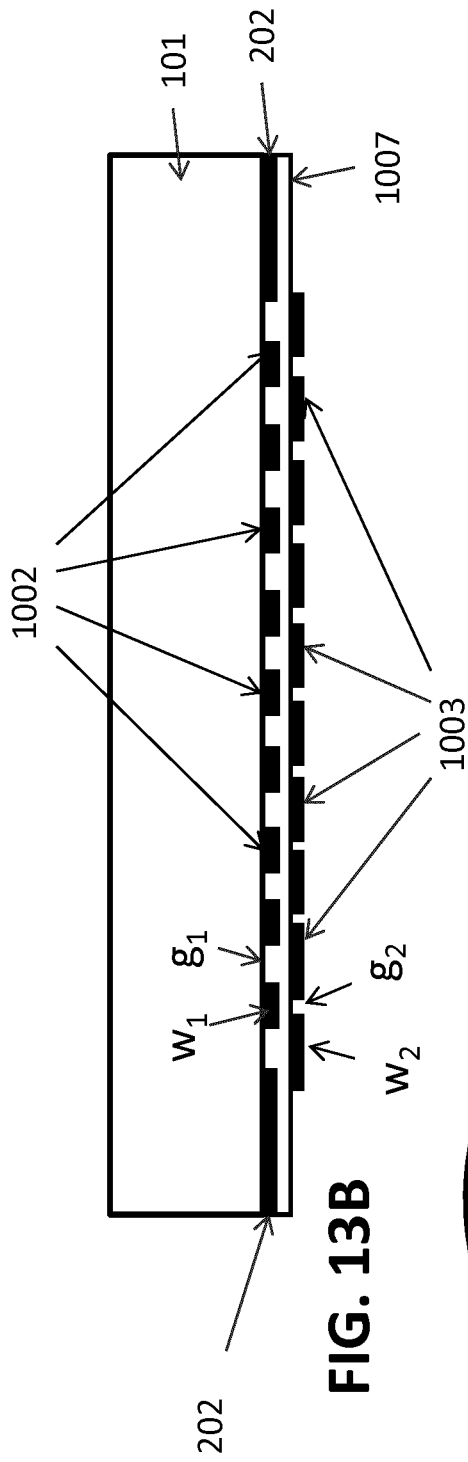
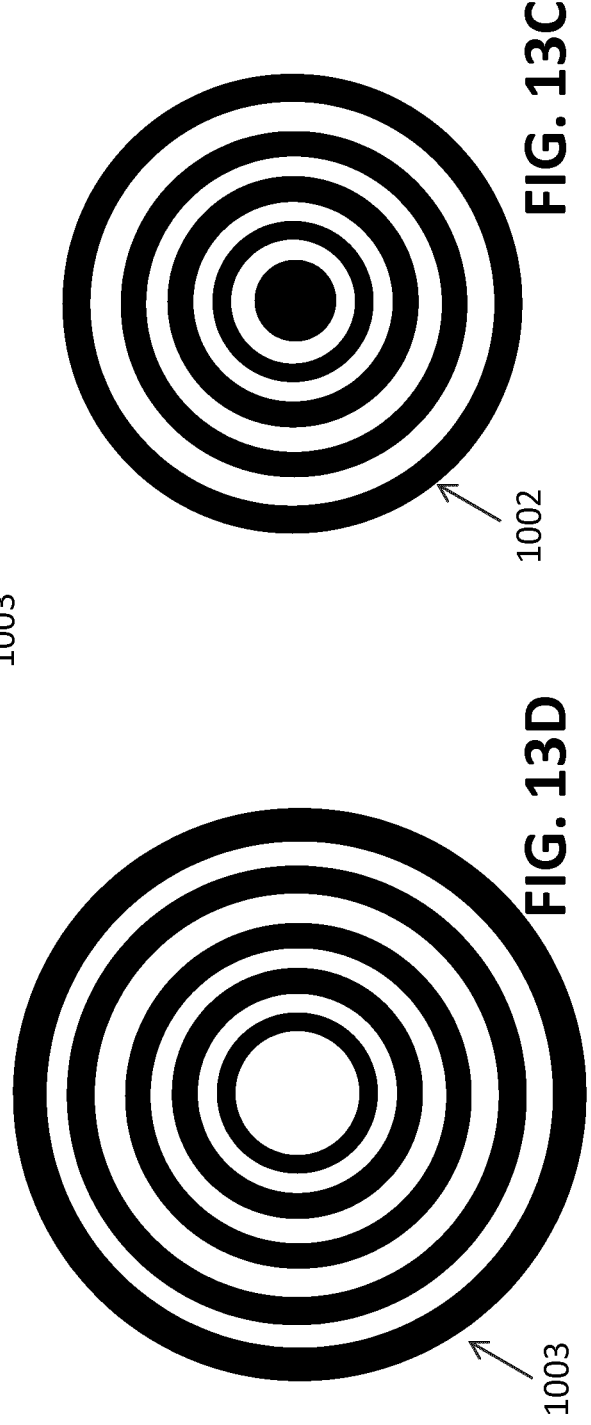
FIG. 13B
FIG. 13C
FIG. 13D

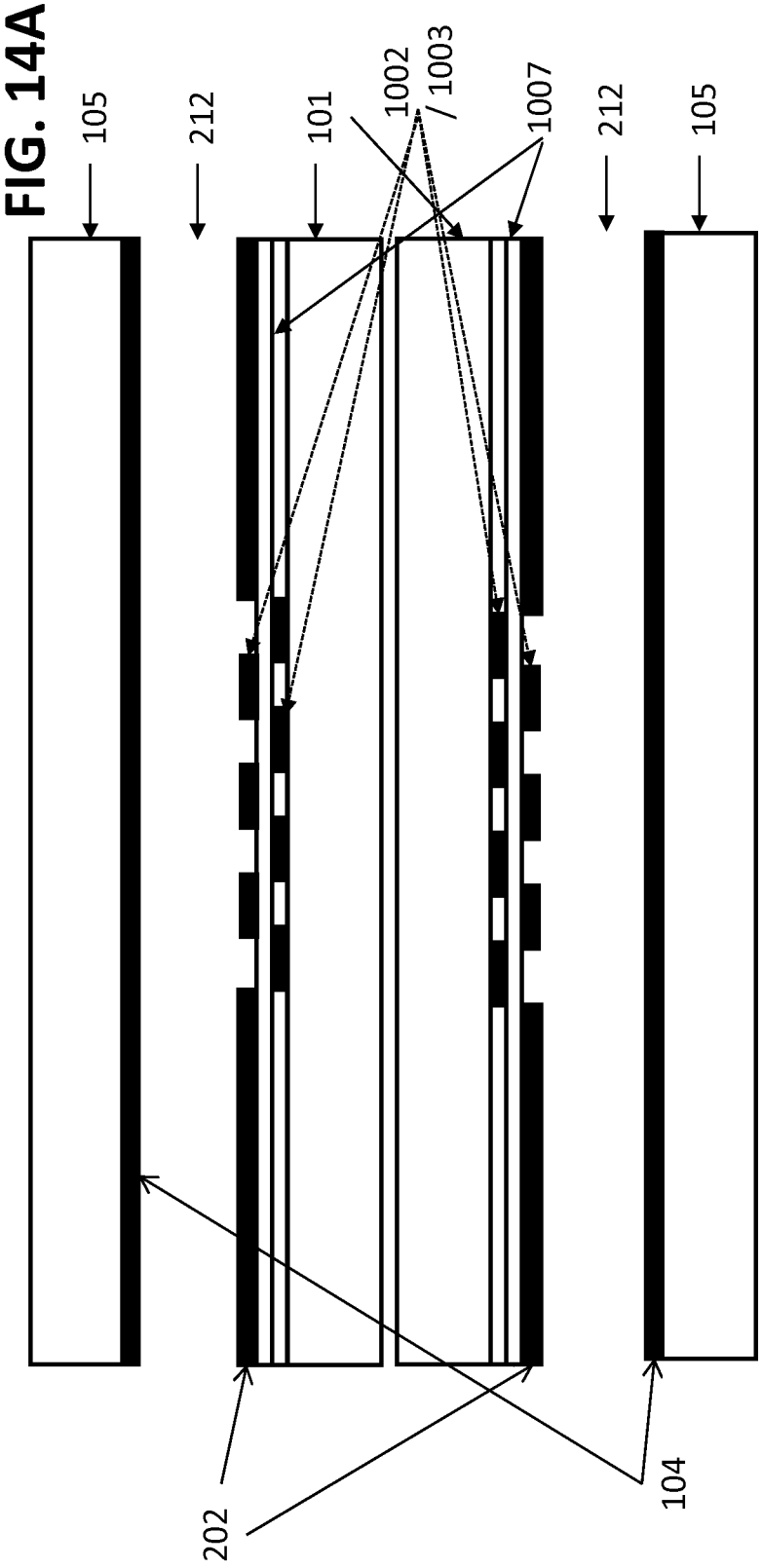

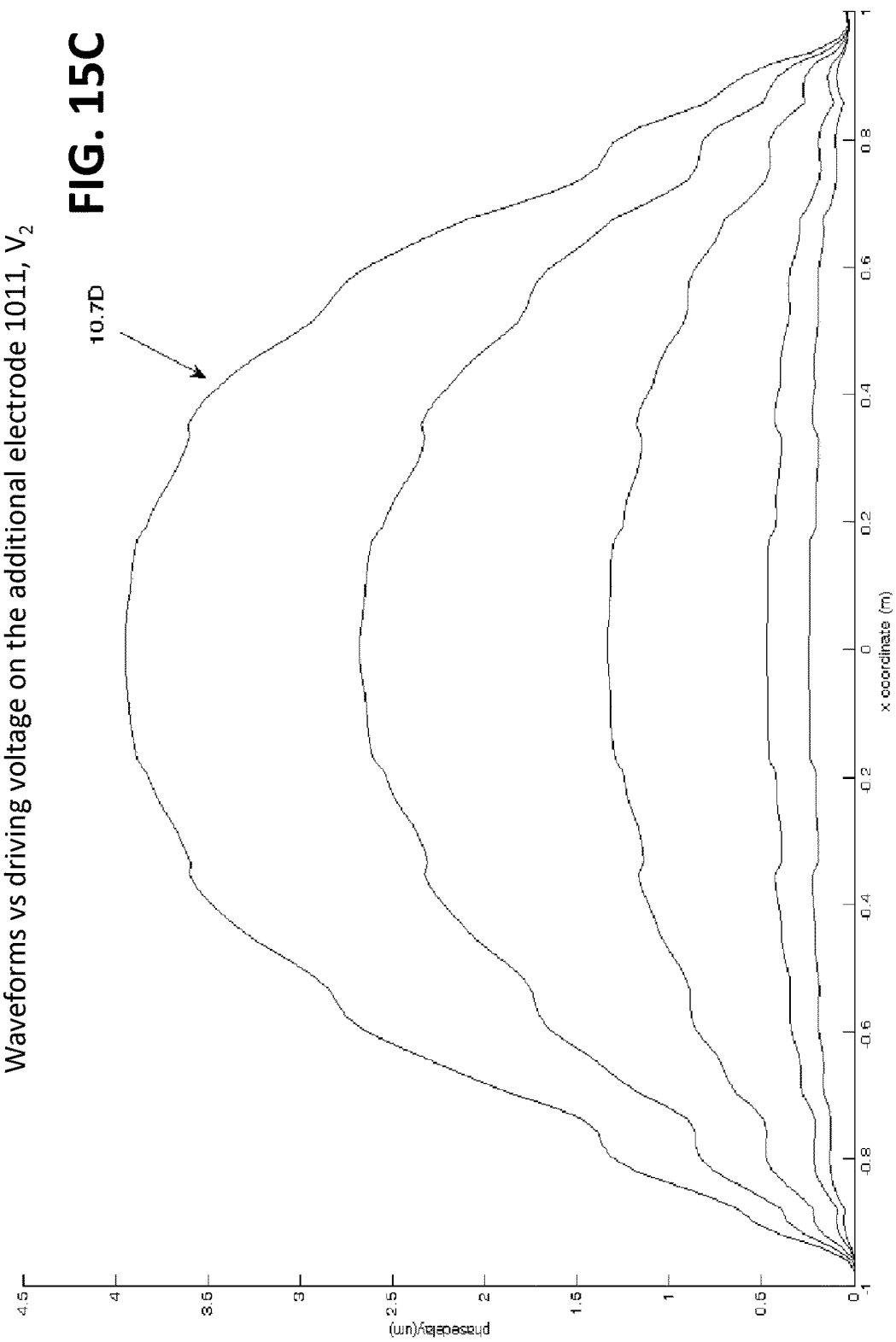

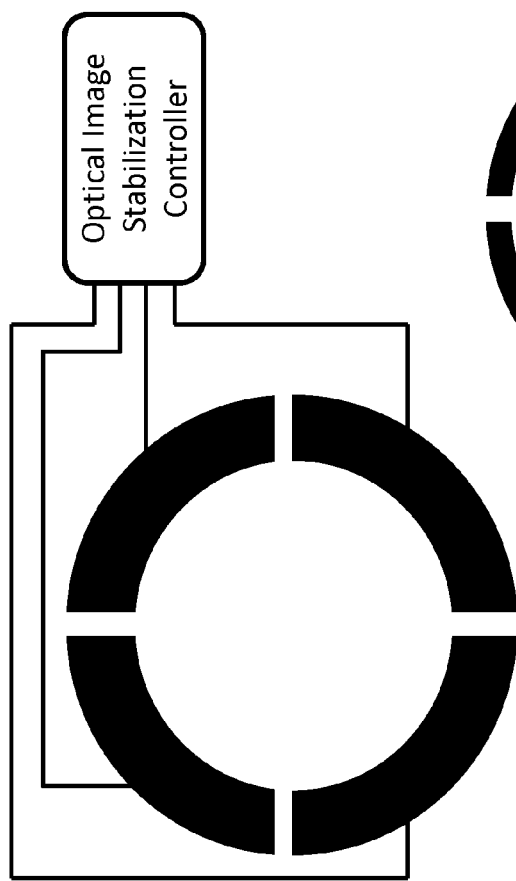
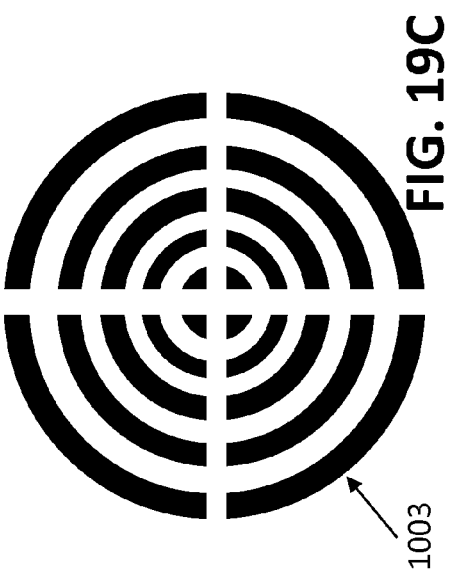

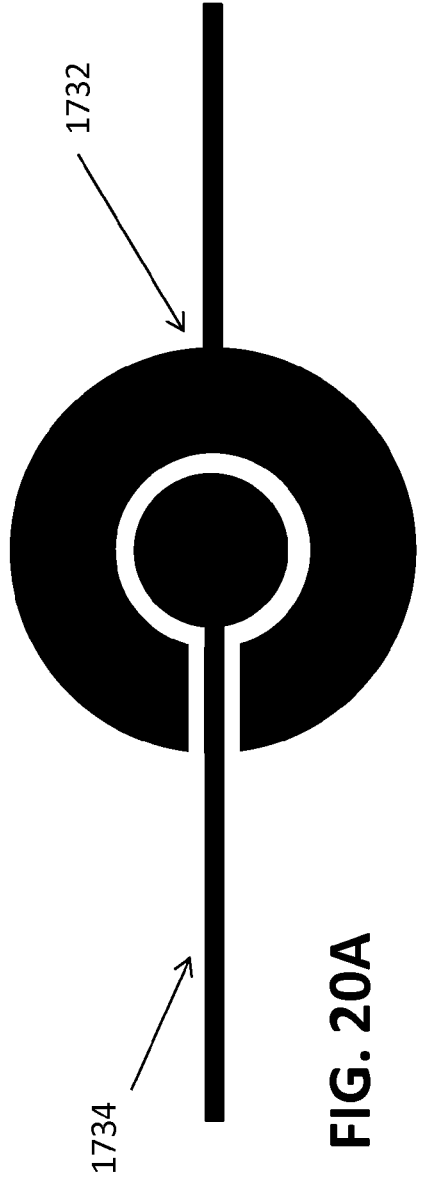
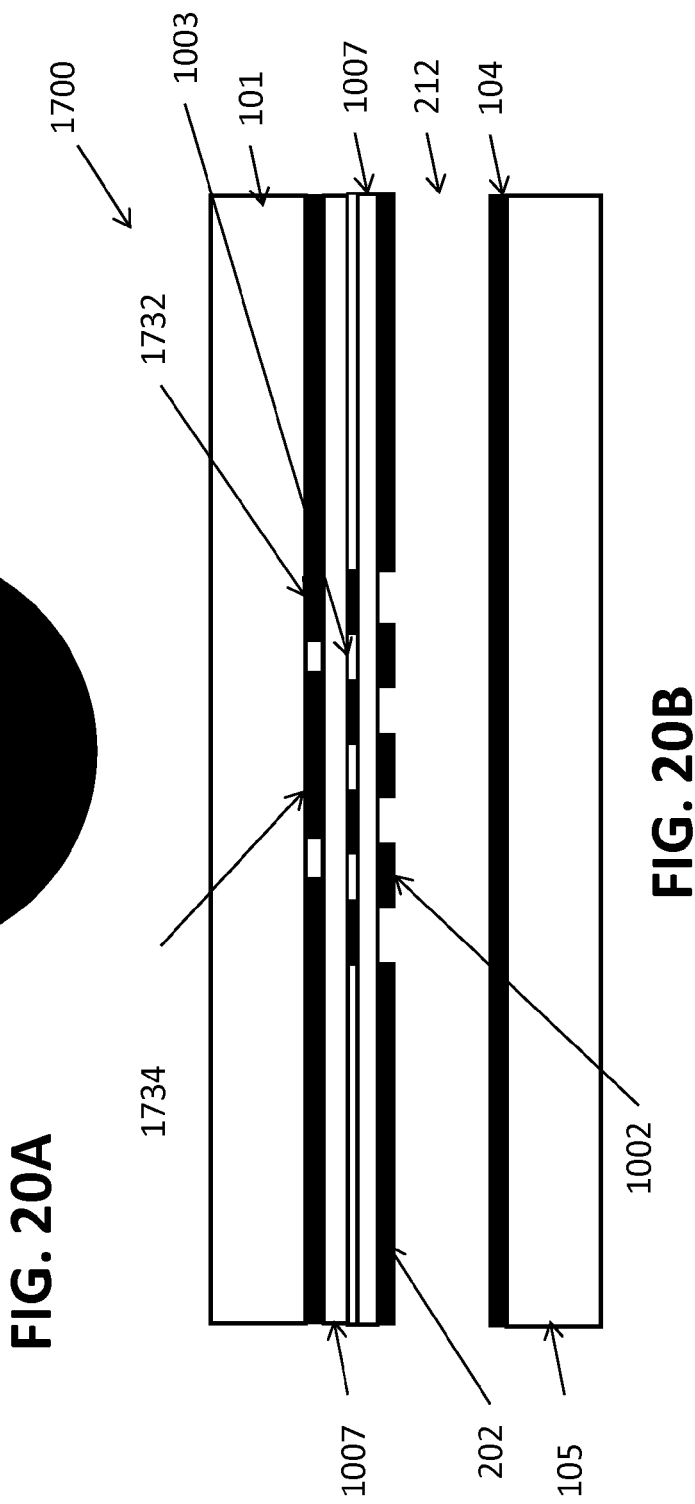
FIG. 20A
FIG. 20B

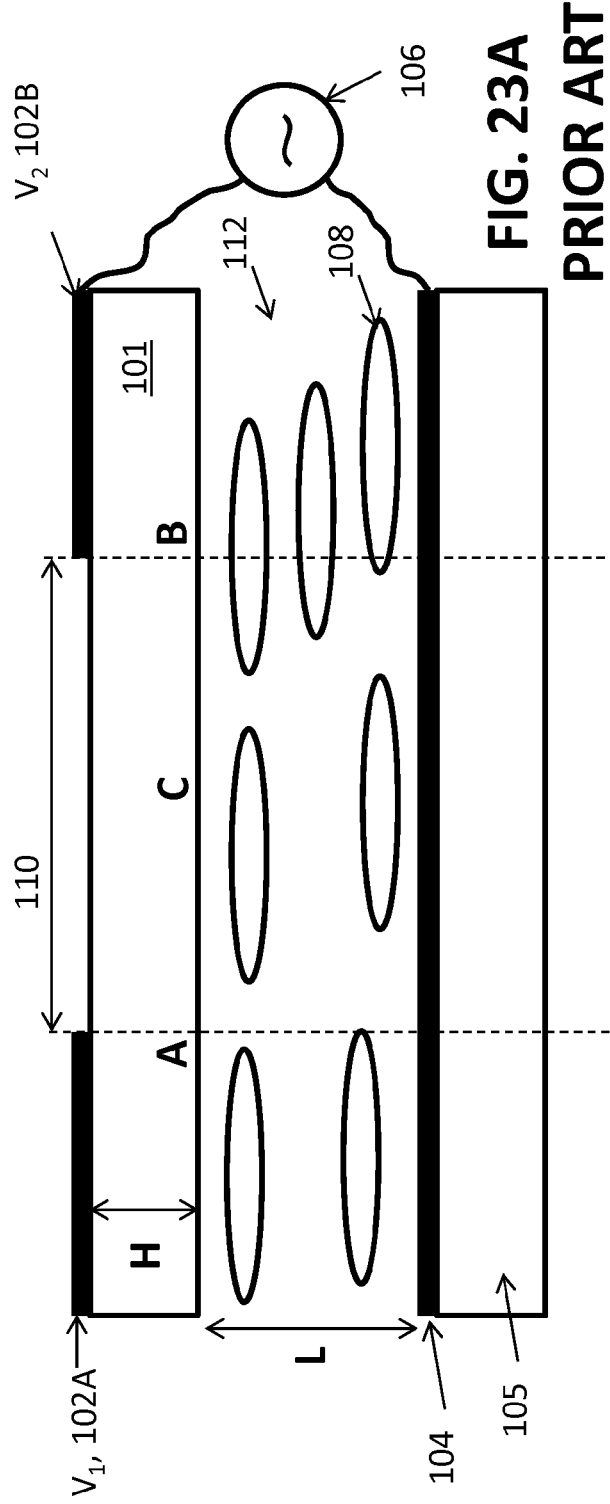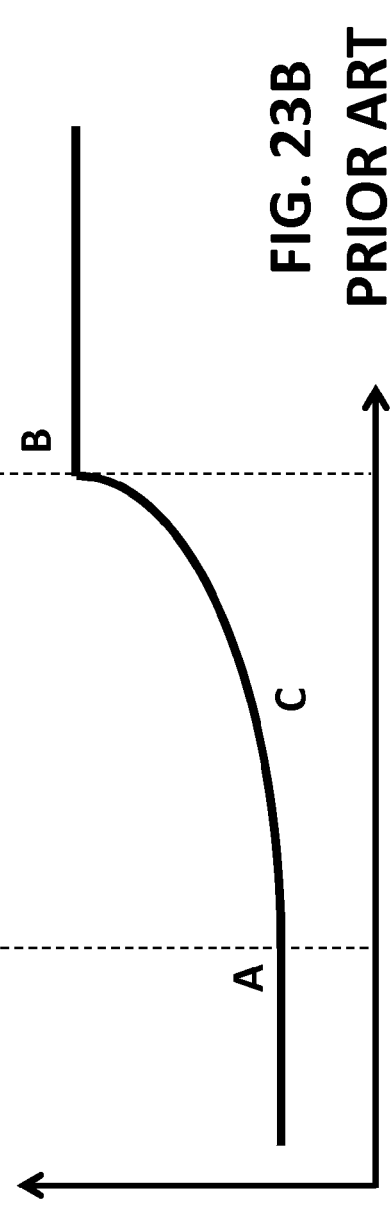
FIG. 23A PRIOR ART
FIG. 23B PRIOR ART

CAPACITIVELY COUPLED ELECTRIC FIELD CONTROL DEVICE

CROSS-REFERENCE TO RELATED APPLICATION(S)

This application is a U.S. National Stage application, under 35 U.S.C. 371, claiming priority of PCT Application No. PCT/CA2013/050862, filed Nov. 12, 2013 which is a non-provisional of and claims priority under 35 U.S.C. 111(b), from U.S. Provisional Patent Application 61/725, 021 of the same title filed Nov. 11, 2012, the entireties of which are incorporated herein by reference.

TECHNICAL FIELD

The proposed solution relates to liquid crystal optical devices and in particular to control electrodes for liquid crystal optical devices.

BACKGROUND

Liquid Crystal (LC) displays (LCD) and lenses (LCL) are known in the art. In large majority of cases that use LCs, an electrically variable gradient index (so-called GRIN) optical lens is formed by controlling the relative orientation gradient of LC molecules in space within a Clear Aperture (CA) of the device. Then, this molecular orientation, being sensitive to the electrical field, the gradient (and respectively, the optical power of the LCL) can be changed by changing the electrical stimulus parameters (voltage, frequency or a combination thereof) without any macroscopic mechanical movement or deformation.

A variety of LCL designs have been proposed which control the orientation of the LC molecules in response to a spatially non-uniform electric field, see for example the review of S. Sato, "Applications of Liquid Crystals to Variable-Focusing Lenses", OPTICAL REVIEW Vol. 6, No. 6 (1999) 471-485. One approach is the use of multiple electrode arrays (such as used in LCDs) to generate a lens-like electric field profile in space. However, the complexity of its manufacturing and of its dynamic control reduces its attractiveness and industrial acceptance.

Another approach 100 was described by S. Sato above which uses a combination of a Hole-Patterned Electrode (HPE) 102 and a Transparent Uniform Electrode (TUE) 104 (on bottom substrate 105), FIG. 1A (Hereafter, the LC alignment layers and other standard elements of LC cell will be omitted to simplify the drawings. Also, schematic cross-sectional views of various designs and embodiments will be mainly presented for the same reasons). The application of an electrical potential difference 106 across the two electrodes 102 & 104 will generate a spatially non-uniform electric field (between points ACB, as schematically illustrated in FIG. 1B). Thus, if the electrical potential distribution (and the corresponding electric field) have the appropriate spatial profile, then the corresponding reorientation of LC molecules 108 and the refractive index modulation within the Clear Aperture (CA) 110 of the device 100 may have the desired spherical (or aspherical, see hereafter) form thus enabling a good quality lens 100. The Optical Power (OP) of such a lens (measured in Diopters) may be expressed as:

$$OP = 2L\Delta n/r^2,$$

(in the case of a spherical waveform)

where L is the thickness of the LC layer 112, $\Delta n$ is the difference of refractive index in the center (around the point C) and at the periphery (around points A and B) of the lens 100 and r is the radius of the CA 110. Note that the focal distance F (measured in meters) is the inverse of OP, F=1/OP. This design being much simpler to manufacture, still has some important drawbacks. Namely, the distance (defined by the LC thickness L and the thickness of the top substrate H) between the HPE 102 and TUE 104 must be relatively large to ensure smooth spatial profile (150) of the electric field inside the LC layer 112. This electrode separation L+H necessarily increases the voltages (several tens of volts) required for the control of the LCL 100.

In an article published by A. F. Naumov et al., entitled "Liquid-Crystal Adaptive Lenses with Modal Control", OPTICS LETTERS/Vol. 23, No. 13/Jul. 1, 1998, an LCL 200 configuration was proposed (shown in FIG. 2), which uses an HPE 202 that is inside the LC cell (the top substrate 101 of the Sato design, shown in FIG. 1, being flipped 180°, upside down). In this case, the HPE 202 and TUE 104 are very close to each other (separated just by the LC 212 of thickness L) and a few volts (<5V) 206 are enough for OP control of the LCL 200. However, left unaddressed the electric field profile would have an abrupt character inside of the LC layer 212. To address abrupt changes in the electric field, a high resistivity or weakly conductive layer (WCL) 214 is cast on the surface of the HPE 202 which smoothens the above mentioned electric field profile due to a very high sheet resistance Rs, which is defined as $R=(d\sigma)^{-1}$, where d is the thickness of the WCL 214 and a is its conductivity. This smoothening may be understood by using the concept of attenuation of the electric potential (from the periphery to the center of the HPE 202) in a classical electronic RC circuit where the capacitance of the unit area of overlap between the two electrodes the TUE 104 and the HPE 202 and which is covered by the WCL 214 material containing the dielectric LC layer 212 in between. At the same time, the role of the electrical resistance R is mainly played by the sheet resistance Rs of the WCL 214.

It happens that the "RC factor" of miniature cameras (with a CA 110 in the order of 1.5 mm to 2 mm) and the dielectric properties $\in_{LC}$ of the LC layer 212 of thickness L are such that the sheet resistance Rs of the WCL 214, that is necessary for a smooth electric field profile, is in the range of tens of MΩ/. The fabrication of such films is a difficult task since manufacturing variations in parameters change noticeably the sheet resistance.

In addition, consumer product cameras are supposed to work with unpolarized light. This requires the use of two LC layers 212 (with their molecular directors being oriented in perpendicular planes, shown in FIG. 3A) to handle two cross oriented polarizations of unpolarized light. To have two such "half" lenses 200 focusing in the same way, two WCLs of the same Rs (within ≈±3%) are needed. This imposes specific conditions on the manufacturing of a polarization independent "full" lens 300. There is another limitation to this approach: the attenuation of the electrical potential (from the periphery of the HPE 202, points A or B, towards the center of the lens, point C) is defined by the physical nature of the RC circuit and thus it is difficult to obtain various aspherical profiles, which are sometimes required to have good optical image quality. Finally, all materials with appropriate Rs values (known so far) are sensitive to temperature variation.

Several alternative approaches have been developed to address, at least in part, the problems of Naumov's geometry. One of them, proposed by LensVector and published in WO2009/153764 which is incorporated herein by reference, is the use of a single WCL 314 to eliminate the severe requirements of manufacturing repeatability, as illustrated in FIG. 4. In this configuration 300, the HPE 302 and the WCL 314 are positioned between two substrates 105 (almost symmetrically) which serve as bottom and top substrates for two cross oriented LC layers 312. Thus, the same control electrode structure (HPE 302 & WCL 314) is used to drive both LC 312 layers similarly.

An alternative approach 400 shown in FIGS. 5A and 5B was proposed by B. Wang, M. Ye, M. Yamaguchi, and S. Sato, "Thin Liquid Crystal Lens with Low Driving Voltages", Japanese Journal of Applied Physics 48 (2009) 098004. In this geometry, the WCL layer 414 is close to the LC layers 412, while there is an additional electrically connected Disc Shaped Electrode (DSE) 416 in the middle of HPE 402, both being positioned outside of the LC cell 400. While this approach helps to avoid transitory molecular orientational defects (so-called disclinations) and to achieve a better control of the electric field profile 500, it still suffers from several drawbacks, including the problem of manufacturability of the WCL 414. This is because, two WCLs (one for each LC layer) are still needed or only one WCL 414 and control electrode (HPE 402 & DSE 416) may be used but it must be positioned relatively far from the TUE 104 since now two LC layers 412 must be driven by the same HPE 402 & DSE 416 electric field control structure. In addition, there is a need to have two independent continuously variable voltages $V_1$ 106 and $V_2$ 406 to drive the LCL 400. Thus, the grounding of the TUE 104 and applying the voltage $V_1$ 106 on the HPE 402 may create a spatially non-uniform potential distribution and corresponding optical power (as shown schematically 500 by the solid curve in FIG. 5B). At the same time, the application of voltage $V_2$ 406 to the DSE 416 may generate a uniform electrical potential (as demonstrated by the solid and dashed horizontal lines, shown in FIG. 5B) avoiding thus the appearance of disclinations or allowing continuous control of the optical power and aberrations of the lens 400. The absolute values of those voltages 106/406 also are still higher than those 206 used in the Naumov's approach (because of the additional distance between electrodes 104/402 imposed by the thickness H of the top electrode 101). This last point was addressed by M. Ye at al. in "Low-Voltage-Driving Liquid Crystal Lens", Japanese Journal of Applied Physics 49 (2010) 100204, RAPID COMMUNICATION, by flipping the top substrate 101 upside-down, by covering the electrodes with 1 μm $SiO_2$ film and by using (as WCL 414) a highly resistive film of water-borne thermosetting paint (TWH-1, Mitsubishi Materials Electronic Chemicals). Finally, there are still some significant wavefront (aberration) problems with this double voltage 106/406 controlled scheme.

To resolve the remaining aberration (wavefront) problems, LensVector in WO2012/079178, which is incorporated herein by reference, has introduced another approach 600, where a transparent floating (non-connected) conductive layer (generally in the form of a disc) 618 is introduced between the two cross oriented LC layers 212 of a pair of Naumov's design half LCLs 200, used in a full lens geometry 600, shown in FIG. 6. The presence of the floating conductive layer 618 improves significantly (compared to Sato's and Naumov's designs) the wavefront profile and the Modulation Transfer Function (MTF) of cameras using such LC lenses 600. In addition, the unique voltage 206 required for driving the lens 600 is very low and the device 600 operates by frequency control.

Alternative approaches were proposed to resolve all three problems (poor WCL 214 repeatability, high voltage 106/406 and undesired wavefront). One of them 700, proposed by N. Hashimoto, "Liquid Crystal Optical Element and Method for Manufacturing Thereof", U.S. Pat. No. 7,619,713 B2, Nov. 17, 2009, is shown in FIG. 7. The basic difference of this design, compared to the Naumov's approach, is the absence of the WCL 214. In fact, Hashimoto proposes the use of optically transparent multiple Concentric Ring Shaped Electrodes (CRSE) 718, which are interconnected via high resistivity "bridges" 720 (the schematic side view is shown in FIG. 7 and the top view is shown in FIG. 8). This "resistively-bridged" structure plays the same role as the WCL (214) in creating a voltage spatial profile over the aperture. The advantage of this approach is that the individual resistivity values ($R_1$, $R_2$, etc.) of the bridges 720 can be adjusted to obtain the desired wavefront. Also, two small voltage $V_1$ 206 and $V_2$ 706 are needed, applied to the center 702 and to the periphery of the external ring shaped electrode 202 with the TUE 104 being grounded to drive the lens 700.

Another approach 800, proposed by Bos et al. "Tunable electro-optic liquid crystal lenses and methods for forming the lenses", US Patent Application Pub. No.: US 2011/0025955 A1, Feb. 3, 2011, is shown in FIG. 9. In addition to the resistive bridges 720 (described by Hashimoto), describes individually addressable CRSEs 818. However, in addition to manufacturing problems, the dynamic control of such lenses will be complicated (similar to LCDs).

An intermediate solution was proposed by Y. Kato et al. in "Automatic Focusing Apparatus", US Patent Application Pub. No. US 2007/0268417 A1, Nov. 22, 2007, where a central DSE and a peripheral HPE are each connected to power supplies, with correspondingly voltages $V_1$ and $V_2$, while all intermediate CRSEs are connected via the resistive bridges to the DSE and HPE. This approach also suffers from manufacturability problems.

In the above mentioned proposals, either resistive bridges 720 or individual control of concentric electrodes 718/818 must be controlled and thus wavefront shape control and low voltage may be addressed to a limited degree. However, there are significant drawbacks in those approaches 700/800 also. One of them is the abrupt variation of the electric field, particularly at the periphery of individual electrode segments 718/818. Thus in the area covered by one electrode segment 718/818, the potential is uniform, while there is an abrupt change between those segments 718/818. This requires very close electrode segments 718/818 to minimize the impact of abrupt changes of the electrical potential. In addition, the relatively flat zones in the wavefront will degrade the MTF of the camera and thus a very high number of such electrode segments 718/818 is required. This, in turn increases the requirements on manufacturing precision of those segments 718/818, on the resistive bridges 720 and the dynamic control of voltage distributions of those structures also becomes extremely difficult to handle in practice.

SUMMARY

In accordance with the above described problems, a need exists to develop an alternative way of generating a non-uniform electric field which would be easier to manufacture and to control while employing low voltages and also providing good optical quality.

In accordance with the proposed solution a different approach of obtaining such results is taken. A spatially non-uniform electric field generation method and method of fabrication are proposed for use in an electrically variable liquid crystal lens or image stabilization devices.

A spatially non-uniform electrode structure is proposed which enables the generation of a predetermined spatially non-uniform electric field profile where the capacitive coupling between different non-connected (or floating) neighboring electrode segments is employed for the generation of the electrical field of desired form by supplying an initial electric potential to a limited number of electrodes.

When capacitively coupled electrode segments are fully insulated from one another, the voltage ratios can be essentially independent of the control signal frequency. This results in voltage control for optical device with the spatial variation of voltage being substantially fixed. In such cases, it can be desirable to use a separate uniform electrode to provide a source of an electric field that can help orient the liquid crystal during control operations. When the capacitively coupled electrode segments are not fully insulated from one another, an R-C circuit is formed that provides for a frequency dependent voltage ratio. This can allow for a choice of frequencies to control the spatial variation of voltage across the aperture of the device.

In some embodiments, one of the connected (powered) electrodes is a transparent uniform electrode (such as ITO, for example) with electrical potential UTUE and the second connected electrode is a hole-patterned (or ring shaped) electrode with another electrical potential UHPE, the remaining electrode segments i being non-connected (i.e. floating) and having decreasing electrical potentials Ui the values of which depend upon their position with respect to their neighbor electrodes (placed at the same or at another level) and upon an intermediate separation layer being placed between the double layer of floating electrode segments (with potentials UHPE, U1, 2, 3 . . . ) and the transparent uniform electrode with potential UTUE.

The intermediate separation layer can also include a material with complex (real and imaginary) dielectric constant.

The spatially non-uniform electrode structure can include two levels of multiple floating concentric electrode arrays, the two levels being separated by a material layer having real and imaginary parts of dielectric constant and enabling the predetermined degree of electrical coupling of the potentials Uup, m and Udown, m+1 between different floating electrode zones (zone m at upper level and zone m+1 at bottom level).

The multiple floating concentric electrode arrays can be positioned between the transparent uniform electrode (with potential U1) and another transparent uniform electrode with a variable potential Uv, dielectric (isolation) layers being placed between the double layer of floating electrode segments and the two transparent uniform electrodes.

In some embodiments, a liquid crystal lens or optical device comprises a liquid crystal cell having: preferably planar cell walls; an alignment coating on at least one and preferably both of the cell walls; liquid crystal material in contact with the cell walls; an electrode structure having: a plurality of capacitively coupled electrode segments separated by at least one insulating layer; an opposed electrode; wherein an electric field can be provided between the electrode segments and the opposed electrode within the liquid crystal cell; wherein a voltage applied to a first segment of the plurality of segments can induce a reduced voltage in subsequent capacitively coupled segments of said plurality of segments; wherein the arrangement of said segments corresponds to a desired electric field spatial profile across an aperture of the liquid crystal cell. The amount of overlap between electrode segments and the spacing provided by the substantially insulating layer defines through the capacitive connection how voltage can be provided from connected one or ones of the electrode segments to unconnected one or ones of the electrode segments. In this way, a spatial profile of the voltage can be provided. The electrode structure can be provided on an inside of the cell walls so as to reduce an operating voltage. The opposed electrode can be structured as a uniform electrode or also as a plurality of capacitively coupled electrode segments.

In accordance with one aspect of the proposed solution there is provided, a liquid crystal lens or optical device comprising: a liquid crystal cell having: preferably planar cell walls; preferably alignment coatings on the cell walls; a liquid crystal material in contact with the cell walls; an electrode structure having: a plurality of capacitively coupled electrode segments separated by at least one insulating layer; an opposed electrode; wherein an electric field can be provided between the electrode segments and the opposed electrode within the liquid crystal cell; wherein a voltage applied to a first segment of the plurality of segments induces a reduced voltage in subsequent capacitively coupled segments of said plurality of segments; wherein the arrangement of said segments corresponds to a desired electric field spatial profile across an aperture of the liquid crystal cell.

In accordance with another aspect of the proposed solution there is provided, a polarization independent liquid crystal optical device comprising: a pair of liquid crystal layers between planar and substantially parallel liquid crystal cell walls, each liquid crystal layer being sandwiched between a corresponding pair alignment layers on said cell walls, each said pair of alignment layers selecting a predetermined liquid crystal molecular orientation in the corresponding liquid crystal layer defining a corresponding director orientation, said directors being substantially orthogonal to one another for providing a polarization independent operation of said liquid crystal optical device; an electrode structure including: for each liquid crystal cell: a hole patterned electrode between said liquid crystal layers, each said hole patterned electrode defining an aperture; a first plurality of electrically floating capacitively coupled electrode segments within each aperture; and an opposed electrode across the corresponding liquid crystal layer; and at least one electric field control structure between said hole patterned electrodes providing said capacitive coupling, wherein an electric field can be provided between the electrode segments and the opposed electrode within the liquid crystal cell; wherein a voltage applied to said hole patterned electrodes induces a reduced voltage in subsequent capacitively coupled segments of said plurality of segments; wherein the arrangement of said segments corresponds to a desired electric field spatial profile across an aperture of the liquid crystal cell.

BRIEF DESCRIPTION OF THE DRAWINGS

The invention will be better understood by way of the following detailed description of embodiments of the invention with reference to the appended drawings, in which:

FIG. 1A is a schematic representation of a prior art liquid crystal lens (with polarization dependence; "half" lens) using an "external" (with respect to the LC cell) hole-patterned electrode in combination with a transparent uniform electrode which is positioned at a "far enough" distance and driven with one variable voltage, $V_1$;

FIG. 1B is a prior art schematic representation of the profile of a spatially non-uniform (between points AC and B) electric field potential which may be obtained by the geometry of the lens described in FIG. 1A;

FIG. 7 is schematic representation of a prior art polarization dependent LCL half lens using multiple transparent concentric ring electrodes part of which are coupled by resistive bridges and others are connected to power supplies;

FIG. 8 is a plan view of the prior art lens of FIG. 7;

FIG. 13B is a schematic representation of the top substrate (used in FIG. 13A) bearing the two levels of multiple transparent concentric ring electrodes which are floating (except the external ring electrode);

FIG. 13C is a schematic diagram illustrating a top view of a top ring structure of FIG. 13B;

FIG. 13D is a schematic diagram illustrating a top view of a bottom ring structure of FIG. 13B;

FIG. 14A shows a geometry of a polarization independent full LCL using the capacitive coupling concept described in FIG. 13A; the two half lenses are built separately and then are attached to each other with 90° rotation of their molecular axes (in perpendicular planes);

FIG. 15C shows the confirmation of waveforms (versus the radial/lateral coordinate) for various optical power values; the "half" lens structure of FIG. 13A is used with the additional transparent conductive electrode, described in FIG. 15A;

FIG. 19A shows schematically segmentation of external connected electrode to perform tilt, image stabilization and additional aberration correction functions;

FIG. 19B shows schematically segmentation of top floating non-connected concentric electrode structures to perform tilt, image stabilization and additional aberration correction functions;

FIG. 19C shows schematically segmentation of bottom floating non-connected concentric electrode structures to perform tilt, image stabilization and additional aberration correction functions;

FIGS. 20A and 20B schematically illustrate a top view and a cross-sectional view of a bipolar liquid crystal lens geometry in accordance with another embodiment of the proposed solution;

FIG. 23A is schematic diagram illustrating a prior art liquid crystal prism optical device geometry;

FIG. 23B is a schematic plot of a potential distribution across the aperture of the prior art liquid crystal prism of FIG. 23A;

DETAILED DESCRIPTION OF EMBODIMENTS

Capacitive Coupled Optical Device Structure and Operation

Figure 10:
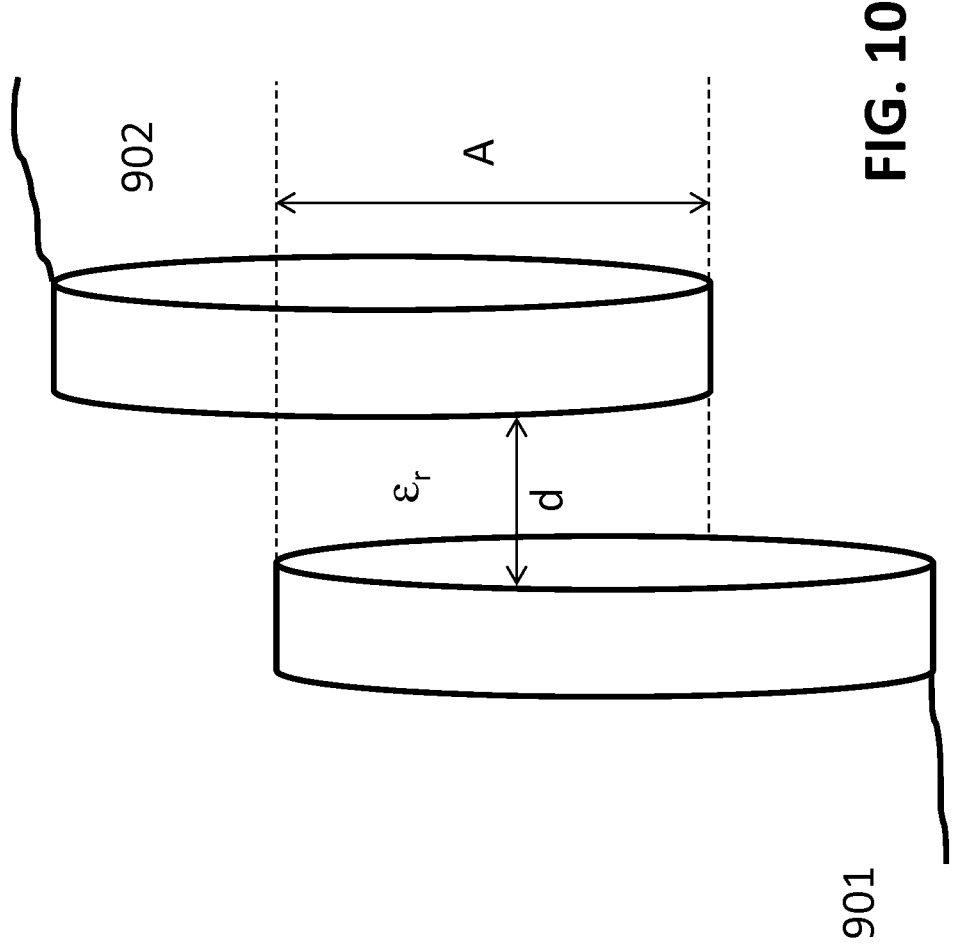
FIG. 10 is a schematic representation of capacitive coupling in accordance with the proposed solution.

The above mentioned problems can be addressed by a different approach based on capacitive coupling. FIG. 10 schematically illustrates the principle of operation of such coupling employing two electrodes 901/902 positioned close enough to allow coupling of their electrical potentials, the capacitance C between the electrodes 901/902 being (just for example)

$$C = \epsilon_r \epsilon_0 A/d,$$

where A is the area of overlap of the two plates, $\epsilon_r$ is the relative static permittivity (sometimes called the dielectric constant) of the separation material (also called "intermediate material") between the plates, $\epsilon_0$ is the dielectric constant of vacuum and d is the separation distance between the plates.

Figure 11:
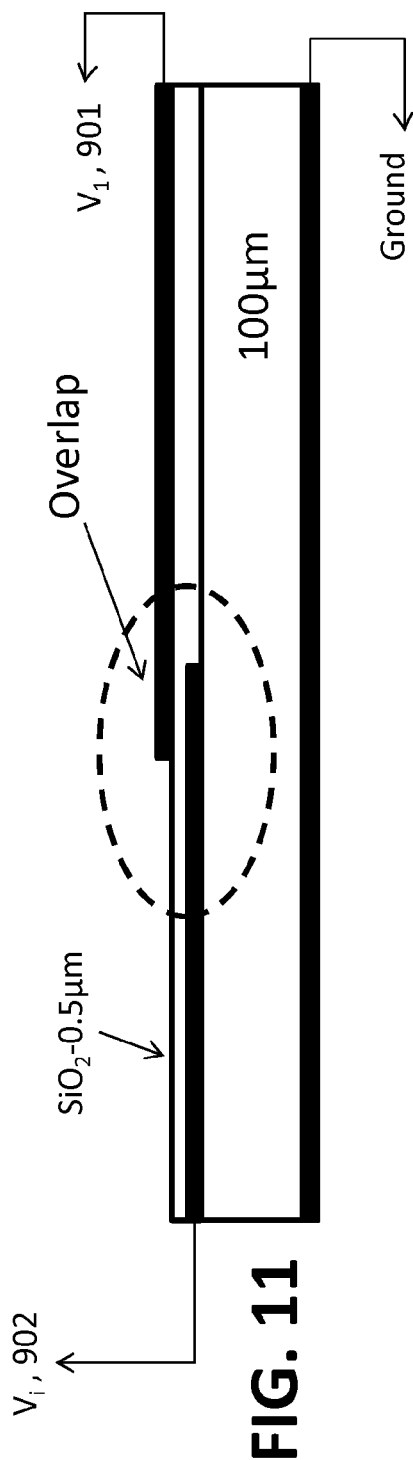
FIG. 11 is a schematic representation of the capacitive coupling experiment.
Figure 12:
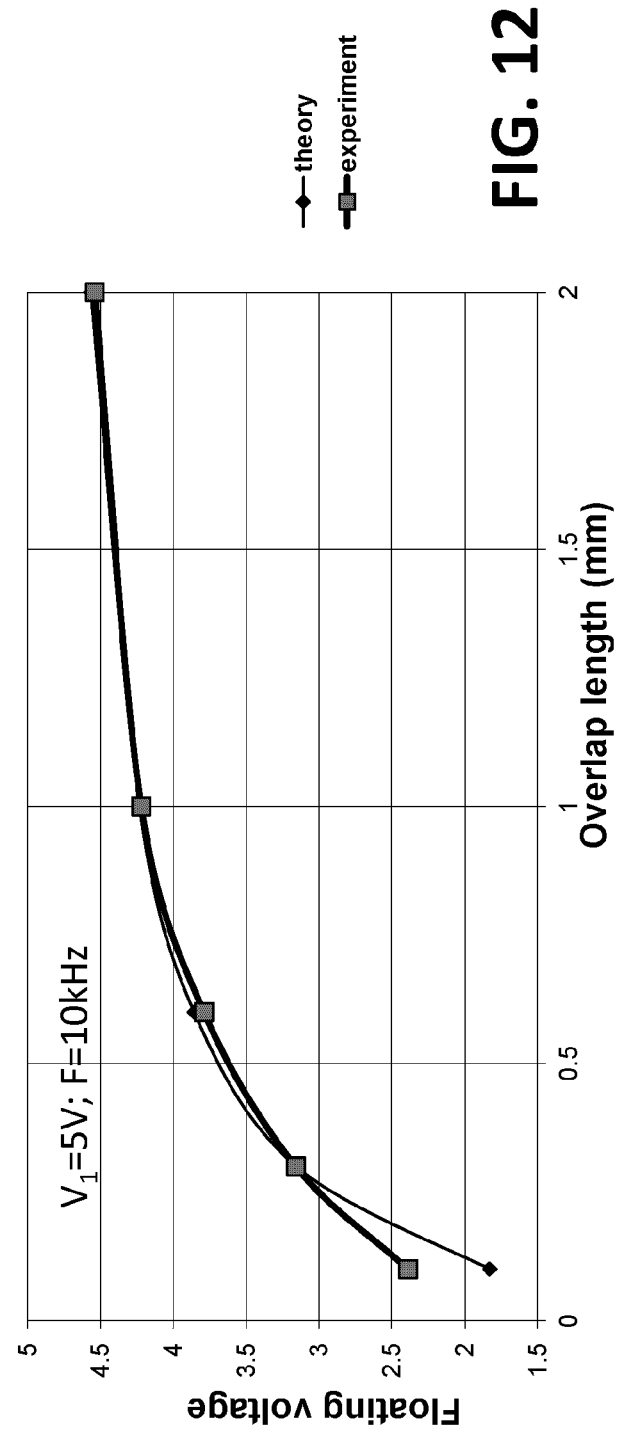
FIG. 12 is the comparison of experimental and theoretical data concerning the capacitive coupling presented in FIG. 11 in accordance with the proposed solution.

The proposed solution is based on the coupling or the transfer of the electrical potential from a connected electrode 901 to another floating electrode 902. The experimental confirmation of such a potential transfer is provided by employing two electrode areas with different "overlap" positioned at the same distance d=100 μm from a ground electrode and separated by a dielectric $SiO_2$ of 0.5 μm thickness, see FIG. 11. The application of the same voltage $V_1$ to the top connected electrode 901 induces voltage $V_i$ in the floating electrode 902 and the value of $V_i$ depends upon the overlap area A, as demonstrated (both theoretically and experimentally) in the FIG. 12.

Figure 13A:
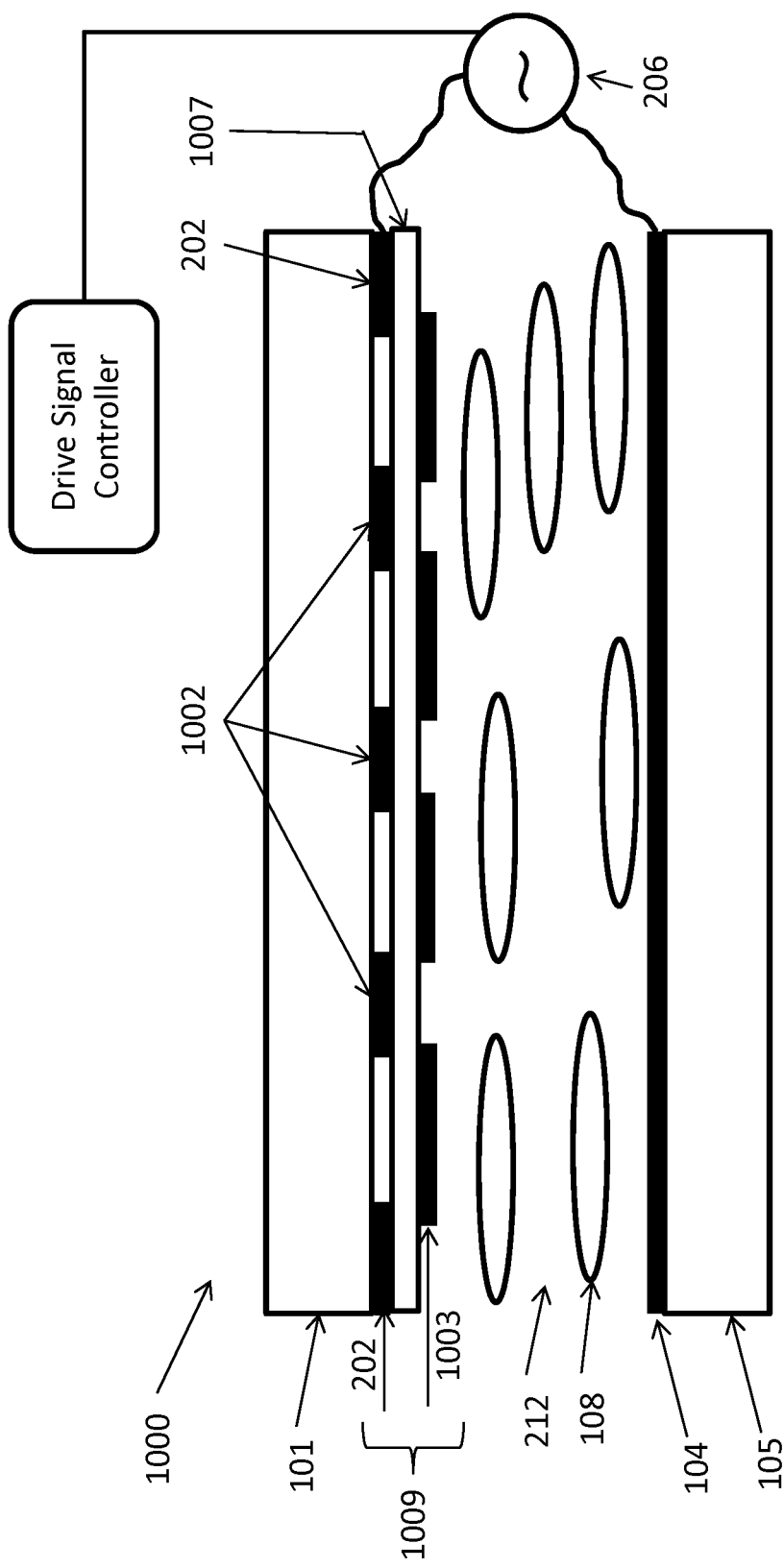
FIG. 13A is a schematic representation of the polarization dependent LCL "half" lens in accordance with the proposed solution using two levels of multiple transparent concentric ring electrodes which are floating (except the external ring and the bottom uniform electrode) and are electrically coupled via the capacitive effect.

Based capacitive coupling, in accordance with a first embodiment of the proposed solution, a new LCL geometry 1000 is illustrated in FIG. 13A, where spatial shaping of the electric field is achieved by a controllable degree of coupling between two neighboring concentric ring structures 1002/1003 (positioned at different levels, one on each side of the "intermediate material" layer 1007). Namely, a single driving voltage 1006, as directed by a drive signal controller, is applied between the TUE 104 (on the top of the bottom substrate 105) and the external ring structure 202 (which can be considered as an HPE 202) placed on the bottom of top substrate 101. For convenience, this electrode level is referred to herein as "level 2" and the electrodes on the level closer to the LC layer will be referred to as "level 1". Note that the LCL described in FIG. 13A will focus only one polarization of light and therefore the geometry 1000 illustrated is referred to as a "half" lens herein.

The electrical potential is coupled from the HPE 202 to the closest Ring-Shaped Electrode (RSE) 1003 on the opposed surface of the intermediate layer 1007. This gradual (step-by-step) coupling between electrode segments 202/1002/1003 at level 1 and level 2 can be controlled and designed by design parameters of the LCL 1000, such as the thickness and the complex dielectric constant of the intermediate material layer 1007, the values the widths w and the gaps g of top (level 2) 1002 and bottom (level 1) 1003 ring shaped electrodes, which have different radius, as shown in FIGS. 13B, 13C and 13D.

The overlap in the embodiment of FIG. 13B is a uniform overlap extending over the whole of each electrode segment. However, it will be appreciated that the overlap which provides the coupling can be provided over a portion of the RSE. For example, there may be a radially (laterally) projecting tab that extends from one RSE 1002/1003 to another.

The advantages of such an approach are many. One of them: there are no zones here without electrodes 202/1002/1003. There is always an electrode segment (either at level 1 or level 2) facing the TUE 104. Thus, there is a much softer change of the electrical potential compared to previous segmented 718/818 solutions. Moreover, only one voltage 206 is required to control such a lens 1000. Note also that well known techniques employing ITO electrodes can be used to optically hide the ring structures 1002/1003 and increase the optical transmission of the described structure 1000.

Figure 13E:
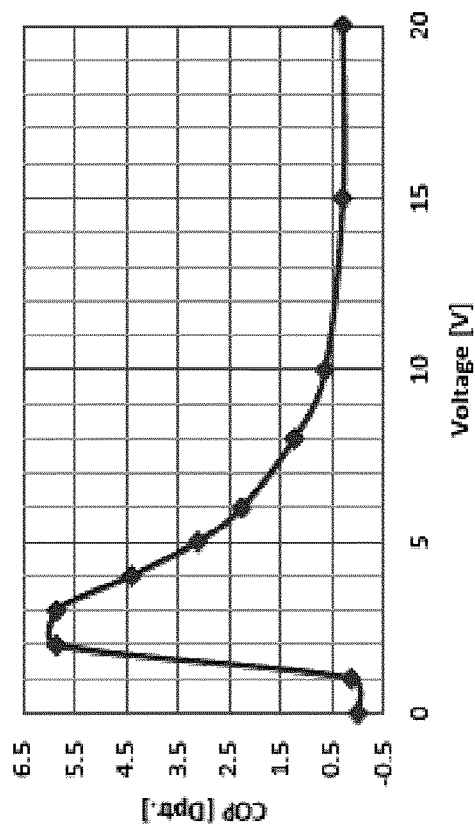
FIG. 13E shows clear optical power (in diopters) experimentally obtained by using the "half" lens structure shown in FIG. 13A.
Figure 13F:
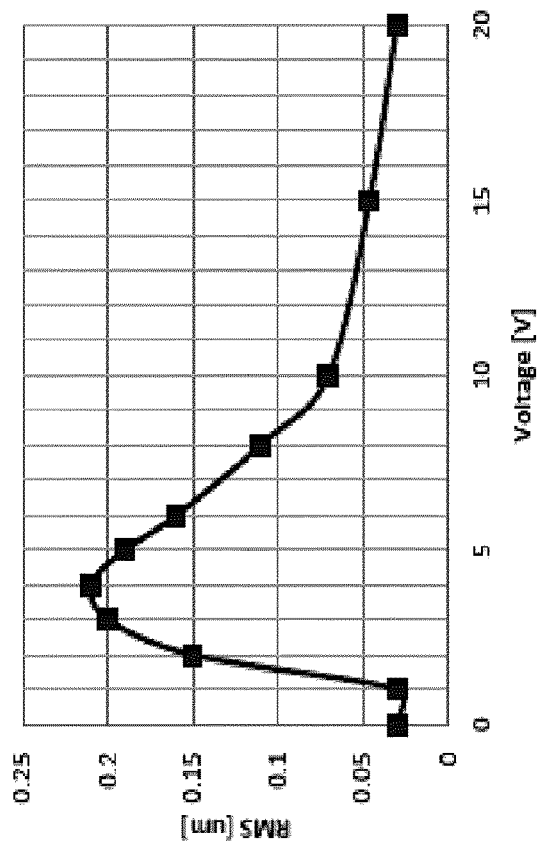
FIG. 13F shows RMS aberrations (in μm) experimentally obtained by using the half lens structure shown in FIG. 13A.

The experimental confirmation of the operation of the proposed solution is presented in the form of dependence of Clear Optical Power (COP=the difference between electrically achievable maximum optical power and of the optical power without voltage) versus the unique driving voltage (FIG. 13E, as well the RMS aberrations' dependence upon the driving voltage (FIG. 13F). Note that, in one proposed embodiment, to avoid the use of relatively high voltages (more than 10V) an LCL with negative residual (electrically non-controllable) optical power can be used to achieve zero optical power (imaging far field objects) without being forced to use either 0 Volt (below the LC reorientation threshold) or high voltages (>10V).

Note that, in another embodiment of the proposed solution, the intermediate material layer 1007 can also have a non-negligible complex dielectric constant (a Very Weakly Conductive Layer, V-WCL), which can introduce a frequency dependence in the process of potential shaping in space. In this case low voltages 1006 can be used (without using residual negative optical power) because the voltage can be fixed (or reduce its required variability) and change the frequency of the driving signal to change the spatial shape of the electric field and thus dynamically control the optical power of the LCL 1000. Typical sheet resistances required for the V-WCL to enable such a frequency control (for example for a frequency variability being in the range of 100 kHz) can be in the range of ~$10^5$ MΩ/. Then, the frequency for which maximal coupling effect between floating rings is obtained generates a substantially uniform (from the periphery to the center of the LCL 1000) electric field which forces all molecules of the LC layer 212 to align perpendicular to the substrates 101/105 of the cell 1000, providing a zero optical power. Then, the frequency which would correspond to the reduced coupling effect would allow the creation of the lens-like electric field and correspondingly higher optical power.

Note also that the connection to the external electrode (HPE) 202 can be made also at the lower level of the double ring structures 1002/1003, not necessarily to the ring structure 1002 which is between the top substrate 101 and the intermediate layer 1007 but the ring structure 1003 which is between the intermediate material 107 and the LC 212 (or its alignment layer, etc.), FIG. 13B side view.

In another embodiment of the proposed solution, two half lenses 1000, illustrated in FIG. 13A are assembled (e.g., by gluing) with approximately 90° rotation of the molecular orientation axis therebetween, FIG. 14A. This enables similar focusing properties for un-polarized light, which can be represented as a combination of two cross-orientated linearly polarized light components. Each linear polarization is focused by one of the half lenses 1000 providing a "full" lens with polarization independent operation.

Figure 14B:
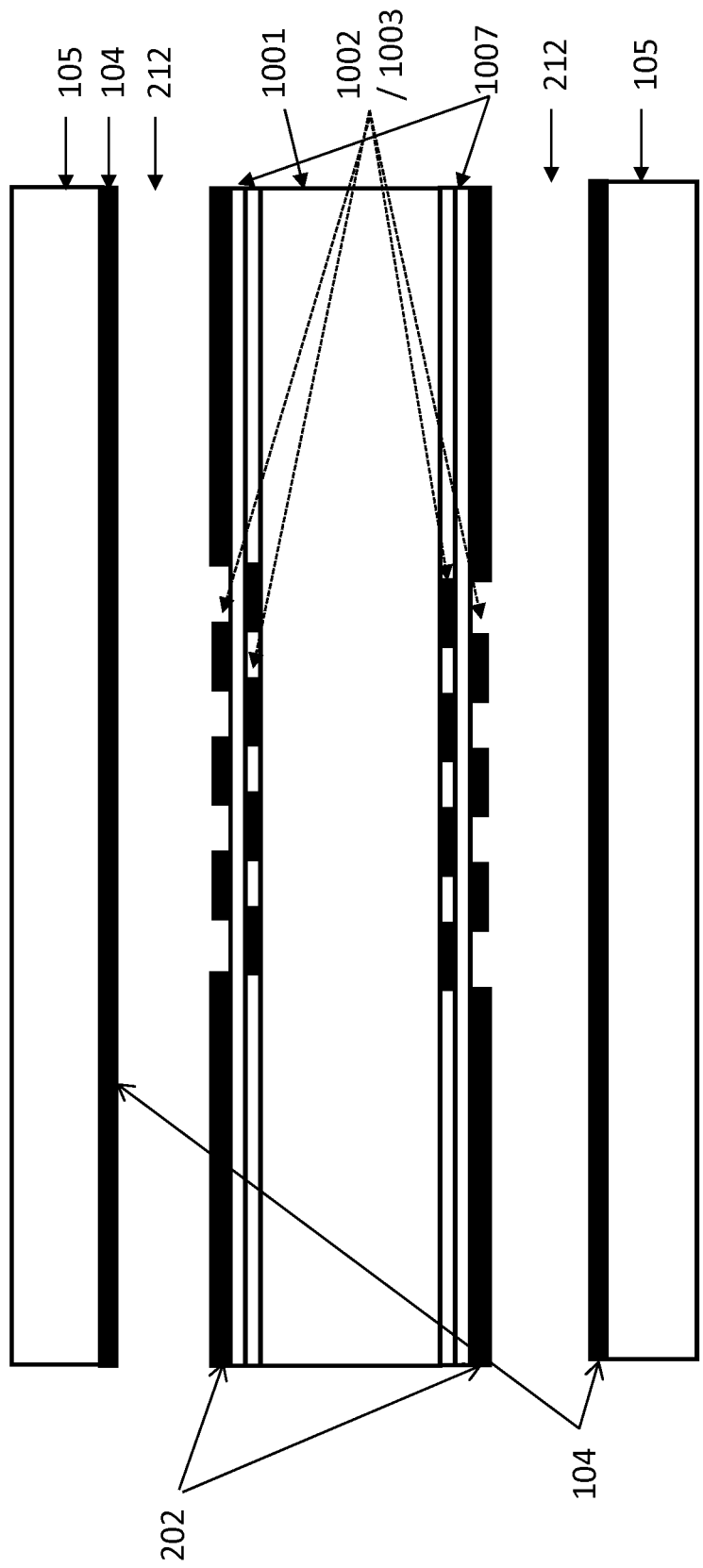
FIG. 14B shows another geometry of a polarization independent full LCL using the capacitive coupling concept described in FIG. 13A; however only one common middle substrate being employed along with two LC layers, which have molecular orientations in perpendicular planes (rotated at 90°)

Alternatively, a single middle substrate 101 can be used sandwiched between the capacitively coupled concentric ring arrangements 1002, FIG. 14B. Then, each of the two cross oriented LC layers 212 can be manufactured on each side of the single common intermediate substrate 101. In this case, a reduced number of lithographic steps and alignment processes can be used, reducing manufacturing cost significantly. In addition, the overall thickness of the LCL can be reduced.

Figure 15A:
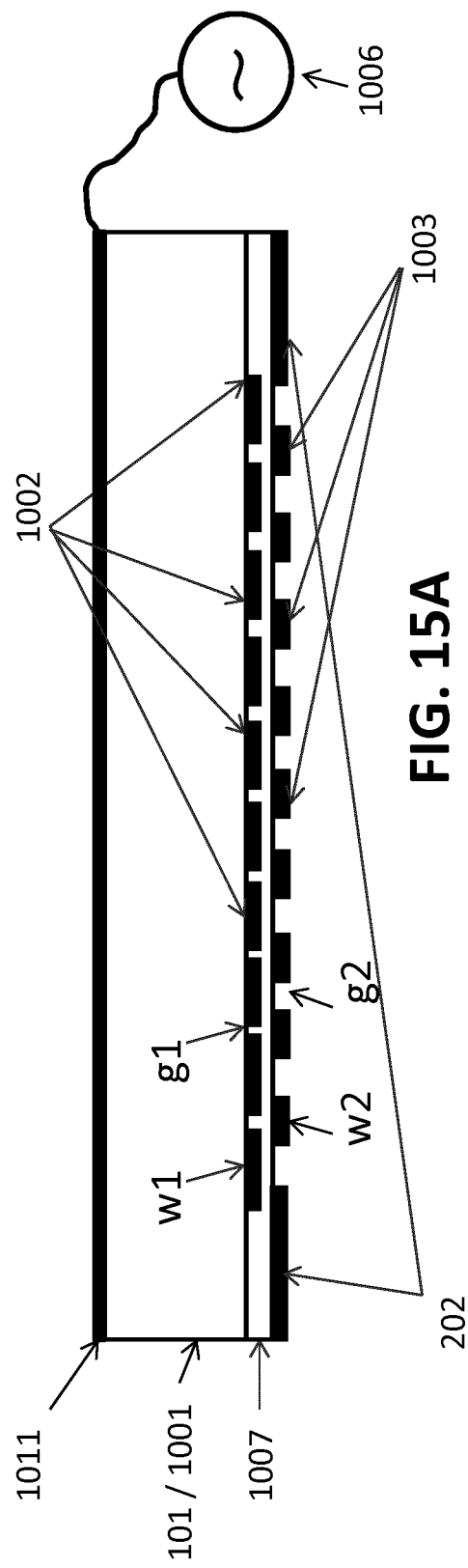
FIG. 15A is a schematic representation of another type of top substrate (which can be used for the capacitive coupled lens, shown in FIG. 13A, which, in addition to the two levels of multiple transparent concentric floating ring electrodes, also employs a transparent uniform electrode that is electrically connected.

In accordance with another embodiment of the proposed solution, an additional TUE 1011 is employed as illustrated in FIG. 15A, for convenience reference will be made to electrode "level 3". In this case, an additional voltage 1006, $V_2$, is also employed for better control of the electric field's spatial profile. The application of the voltage 206, $V_1$, between the previously described structure of capacitive coupled double layer of concentric ring electrodes 1002/1003 (only to the external ring 202) and the bottom TUE 104 (not shown here) provides a spatially non-uniform lens-like electric field, refractive index modulation and correspondingly a desired high optical power. Furthermore, to control the profile of the lens and, in particular, to reduce the optical power towards zero (without going to the state of $V_1$=0), voltage 1006, $V_2$ is applied to the additional TUE 1011. In the extreme case, if the field generated by this electrode with (1006) $V_2$ is stronger than the field generated by voltage (206) $V_1$ applied to the ring structure 202 then the LC molecules (108) across the aperture (110) will align substantially perpendicular to the surfaces of the cell 1000 walls thus providing zero optical power.

Figure 15B:
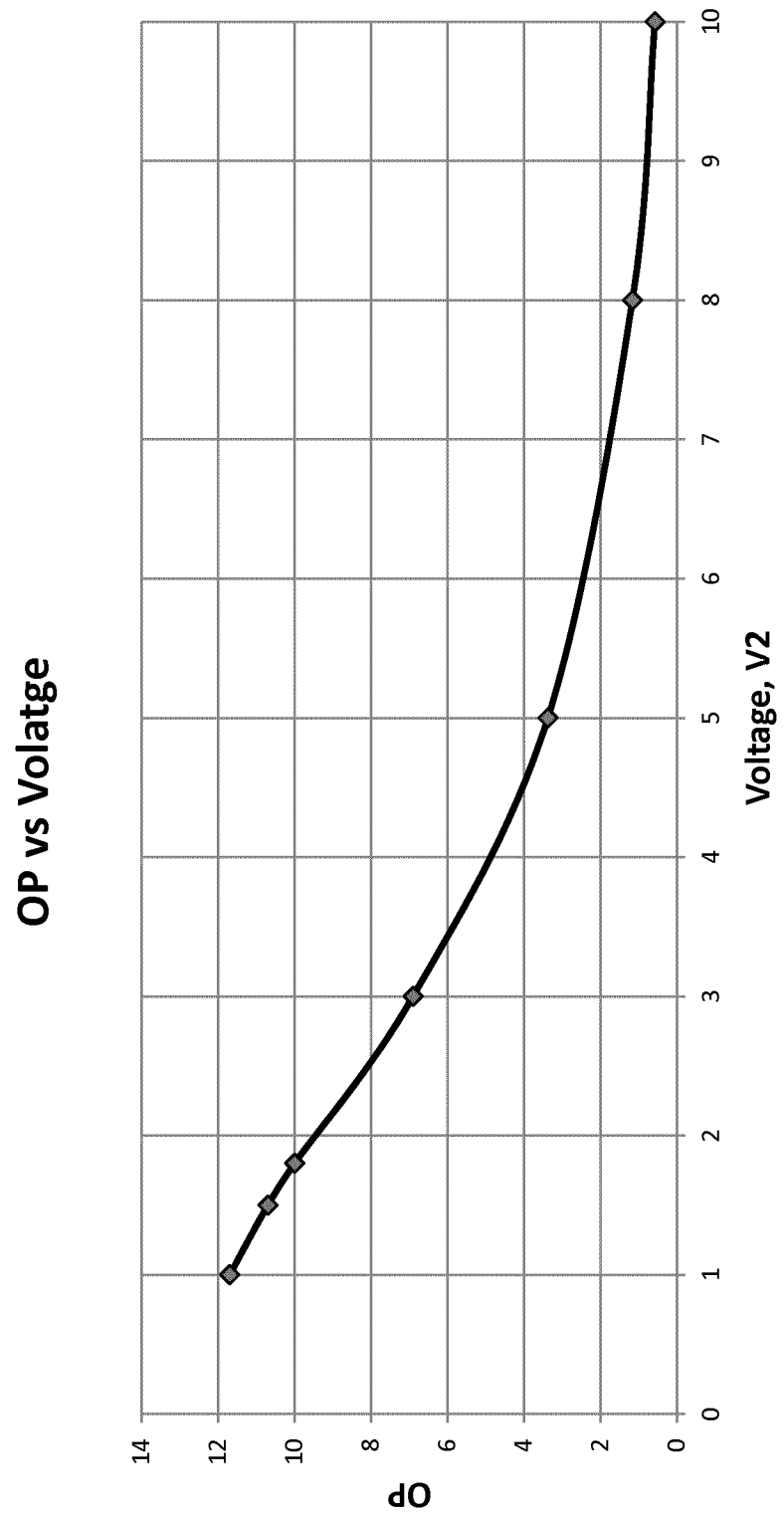
FIG. 15B shows confirmation of optical power values (in Diopters) versus the control voltage of the additional transparent uniform electrode, introduced in FIG. 15A; the "half" lens structure of FIG. 13A is used with the additional transparent conductive electrode, described in FIG. 15A.
Figure 15D:
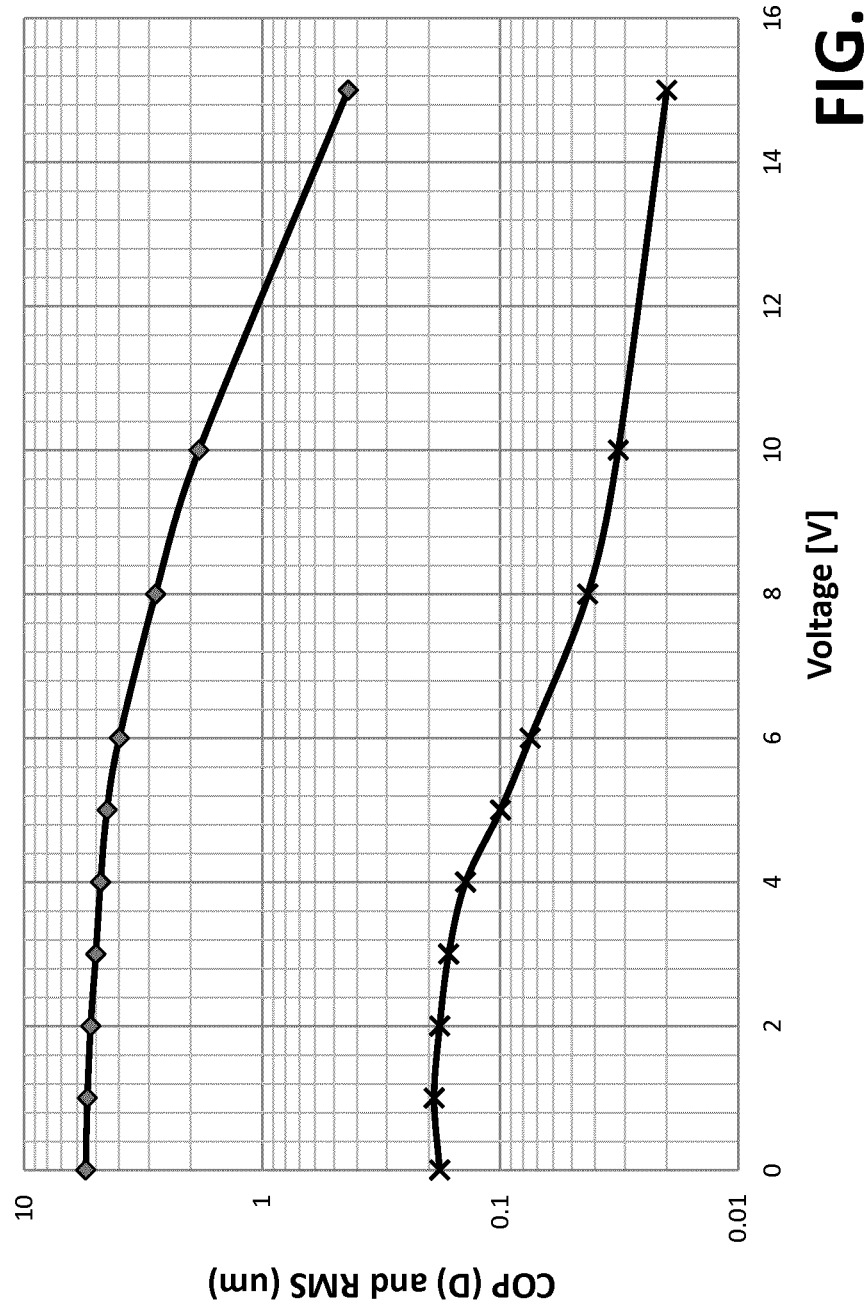
FIG. 15D shows the experimentally obtained optical power and RMS aberration values versus the control voltage of the additional transparent uniform electrode, introduced in FIG. 15A; the "half" lens structure of FIG. 13A is used with the additional transparent conductive electrode, described in FIG. 15A.

Simulations confirm the performance of this last embodiment. Corresponding simulation parameters are: LC thickness L=40 μm, dielectric glass substrate thickness=50 μm (between the additional electrode and coupled double structure of ring electrodes), $W_1$=170 μm, $g_1$=30 μm, $W_2$=$g_2$=100 μm, dielectric intermediate material thickness=1 μm, dielectric constant=8, HPE's electrode 202 voltage=5V, at least the additional uniform electrode 1011 voltage $V_2$ being variable. The results obtained for the optical power and wavefront are presented in FIG. 15B and FIG. 15C respectively. Corresponding experimental results, for the dependence of clear optical power (diopters) and RMS aberrations (μm) versus the voltage $V_2$ (applied to the additional TUE) are presented in FIG. 15D.

Figure 16A:
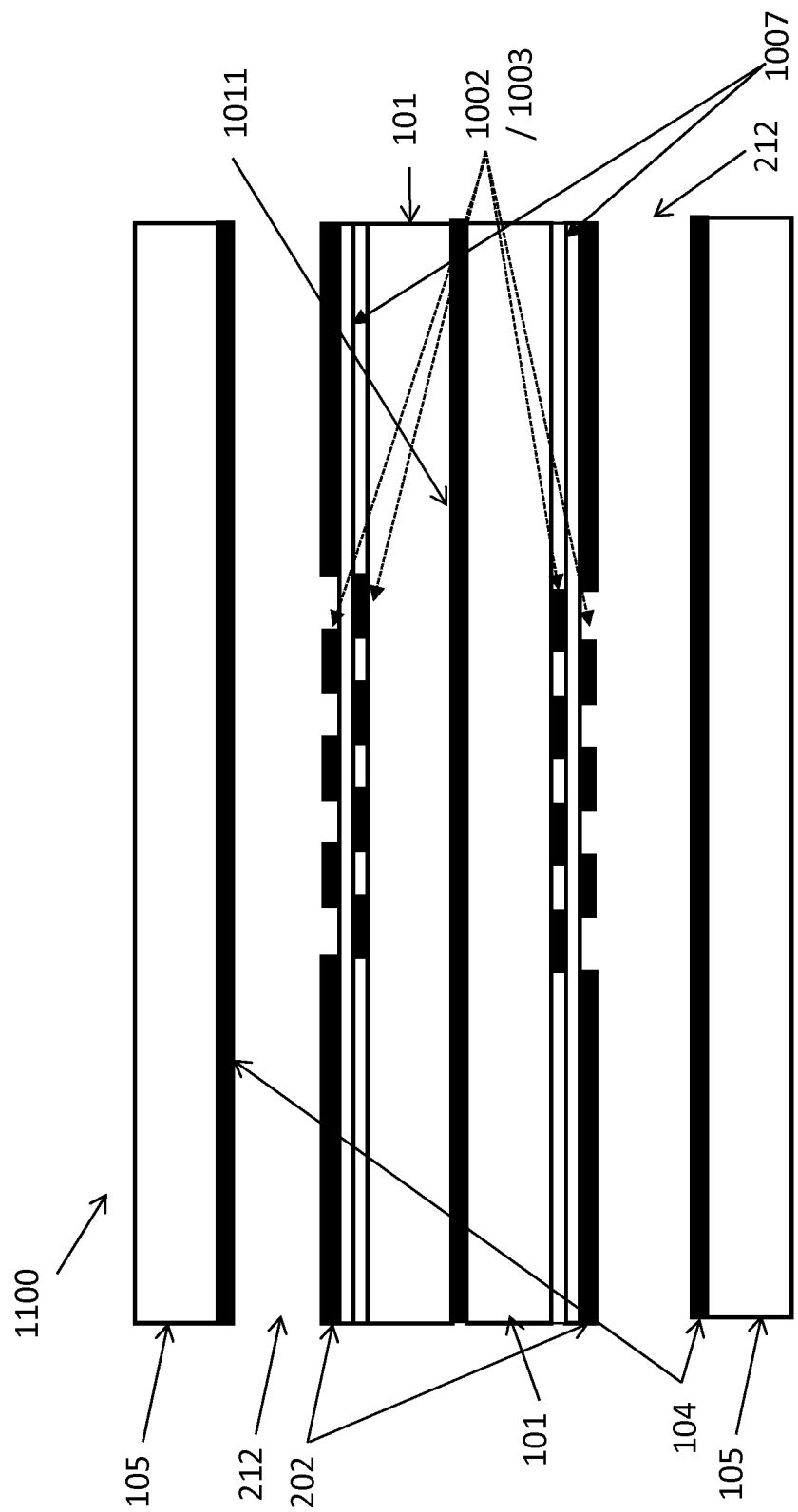
FIG. 16A shows a geometry of a polarization independent full LCL using capacitive coupling as described in FIG. 13A with the modified top substrate, described in FIG. 15A; the two half lenses are built separately and then are attached to each other with 90° rotation of their molecular axes (in perpendicular planes)

In accordance with another embodiment of the proposed solution, a polarization independent LCL 1100 can include two of the above mentioned half lenses 1000, rotating them to obtain 90° (crossed) orientation of their molecular alignments and gluing them together as illustrated in FIG. 16A.

Figure 16B:
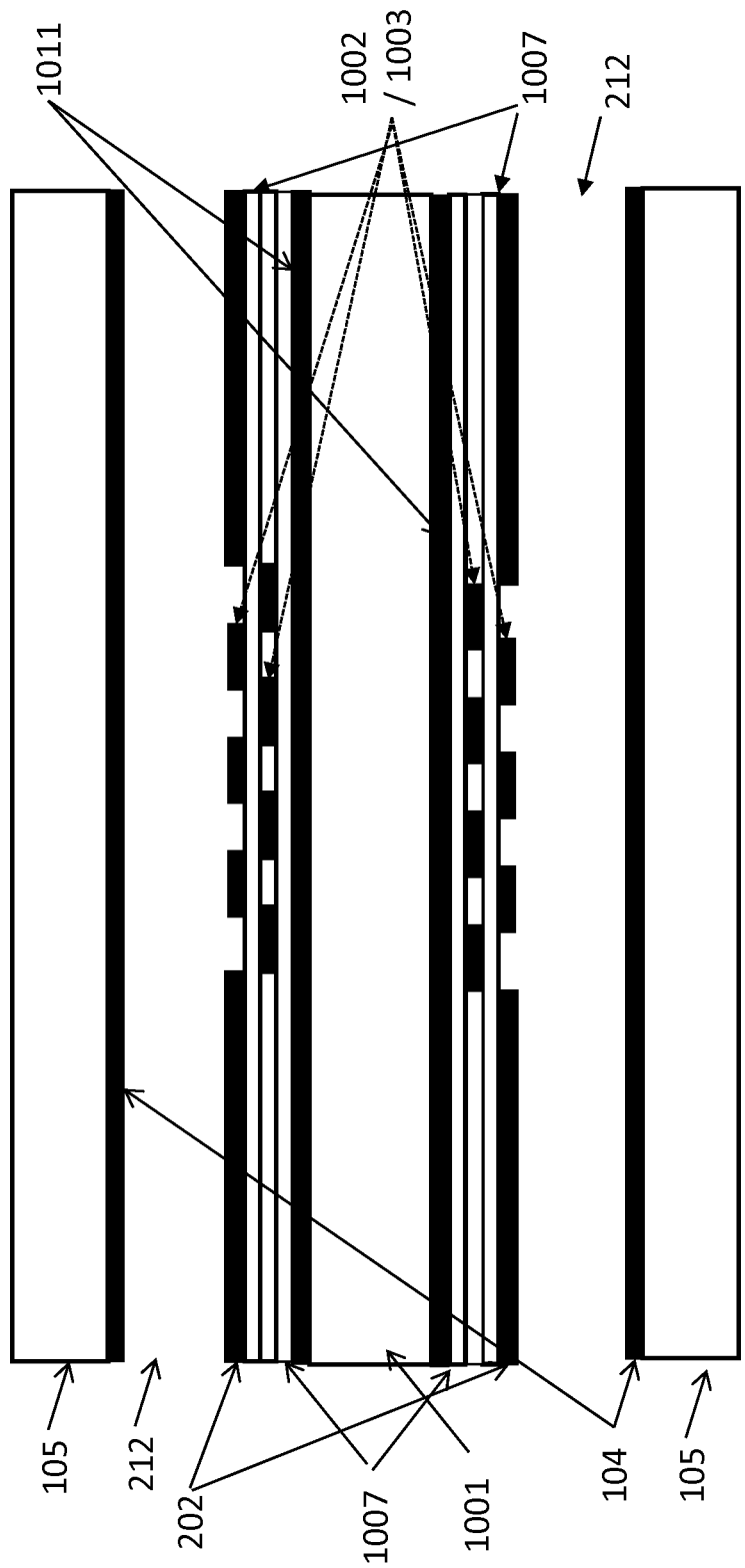
FIG. 16B shows another geometry of a polarization independent ("full") LCL by using the capacitive coupling, described in FIG. 13A, and the modified top substrate, introduced in FIG. 15A; only one common middle substrate employed along with two LC layers, which have molecular orientations in perpendicular planes (rotated at 90°)

Alternatively, a single (or common) middle substrate 1001 can be employed, sandwiched between the additional TUE 1011, by a first intermediate layer 1007 (for isolation or insulation), and by capacitive coupled double layer of floating ring structures 1002/1003, as shown in FIG. 16B. This employs a reduced number of lithographic and positioning operations, reducing manufacturing cost.

Figure 17A:
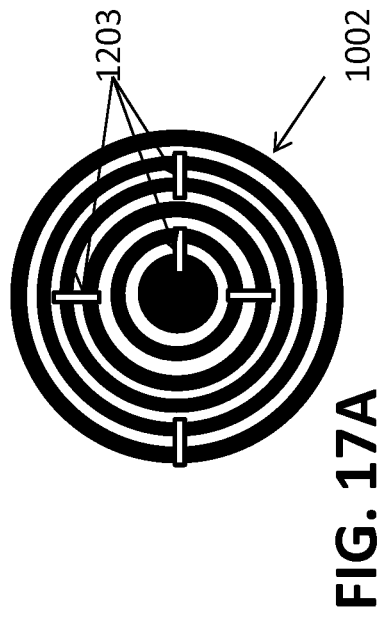
FIG. 17A illustrates in accordance with the proposed solution another geometry employing capacitive coupling between neighboring concentric ring electrodes by using discrete bridges (oriented in different directions) instead of a second level of concentric rings.
Figure 17B:
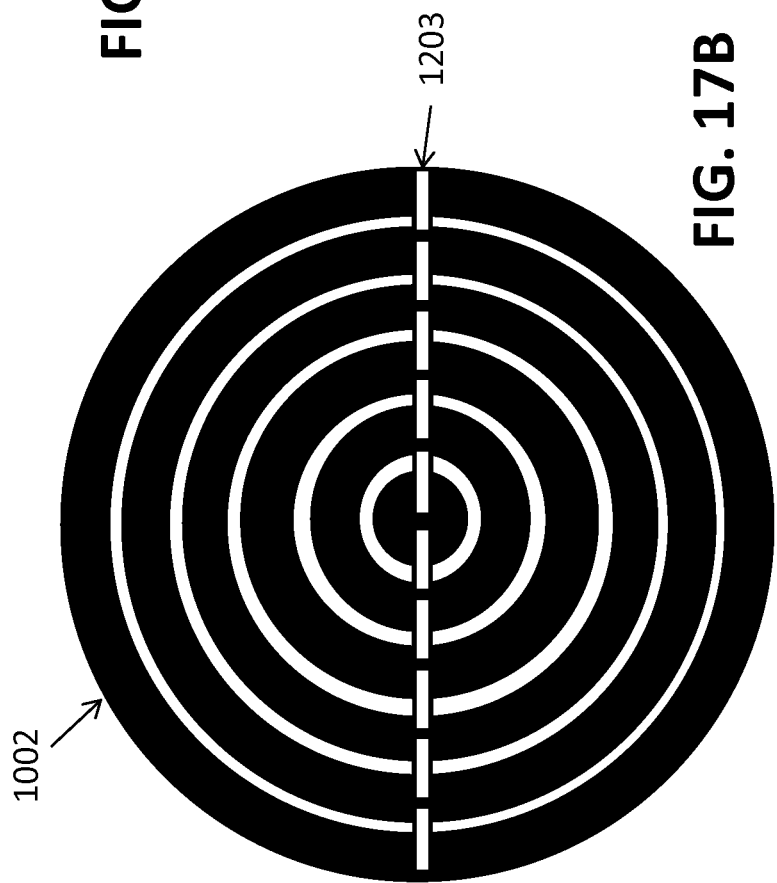
FIG. 17B shows another geometry employing capacitive coupling between neighboring concentric ring electrodes by using discrete bridges (oriented approximately in the same direction) instead of a second level of concentric rings.

In accordance with another embodiment of the proposed solution other forms of floating electrodes are employed to provide the capacitive coupling. Namely, the above mentioned double ring structure 1002/1003 can be replaced by only one layer of concentric floating ring electrodes 1002 (at level 1), while capacitive coupling can be achieved by using non-concentric (for example rectangular) capacitive bridges 1203 placed at level 2, see FIG. 17A. In this case an intermediate material 1007 is employed between one-level ring layer 1002 and the transparent (for example rectangular) capacitively bridging transparent electrodes 1203, FIG. 17A. The distribution of the capacitive bridges 1203 can be different, including cases of almost equal angular distribution (FIG. 17A) or quasi linear alignment FIG. 17B. The manufacturing process can be simplified since the relative shift of the rectangular electrodes 1203 (with respect to the concentric ring electrodes 1002) in a given (horizontal) direction would reduce the coupling overlap area from one side of concentric rings 1002, but the same shift would increase the overlap area in the opposed direction. The overall overlap area will remain almost the same. Since each ring (1002) is considered conductive, the overall potential distribution will be the same on that ring (1002).

Figure 17C:
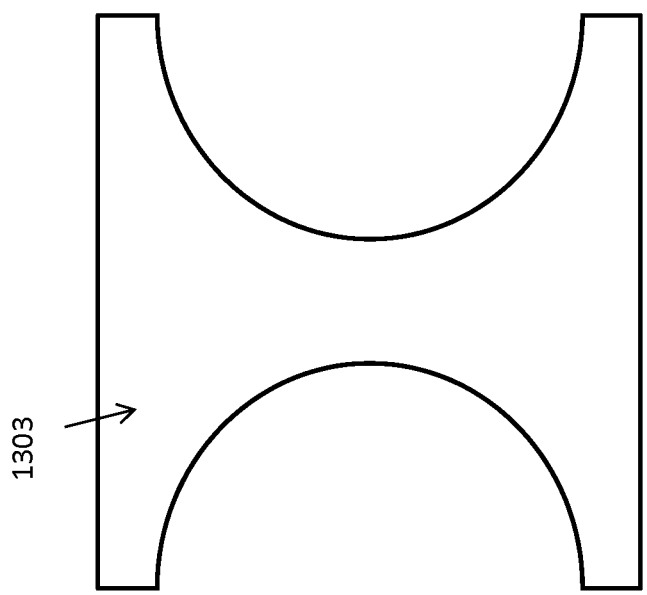
FIG. 17C shows another geometry employing capacitive coupling between neighboring concentric ring electrodes by using a single (with one axes) "butterfly" connected electrode instead of using discrete capacitive bridges.

FIG. 17C schematically illustrates another embodiment according to which gradual capacitive coupling is achieved between neighboring concentric ring electrodes 1002 (at level 1) by employing a single (one axes) "butterfly"-shaped connected (with voltage $V_1$) electrode structure 1303 (placed at level 2) instead of using discrete capacitive bridges 1203. This approach provides significant reductions in manufacturing requirements.

Figure 17D:
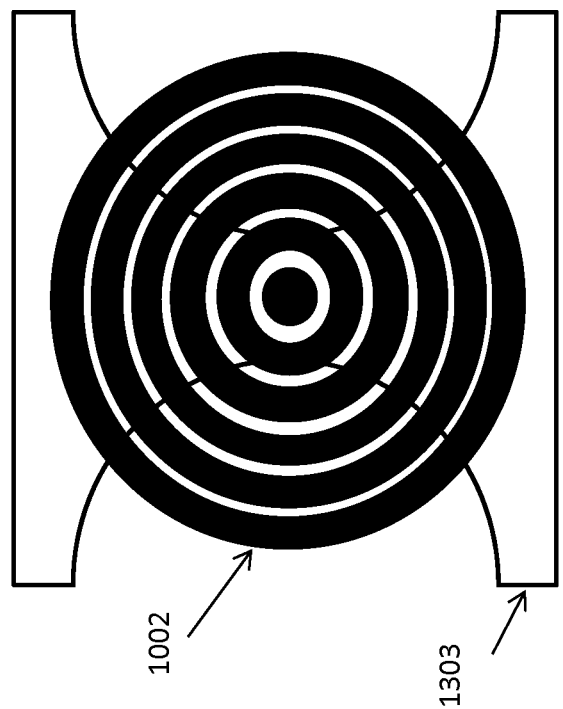
FIG. 17D shows a combination of floating ring shaped electrodes (at level 1) and of the butterfly capacitive electrode with a voltage $V_1$ applied (at level 2)

FIG. 17D schematically illustrates the combination of the floating ring shaped electrodes 1002 (at level 1) and of the "butterfly" connected electrode 1303 with a voltage $V_1$ applied (at level 2) to ensure the capacitive coupling.

Figure 17F:
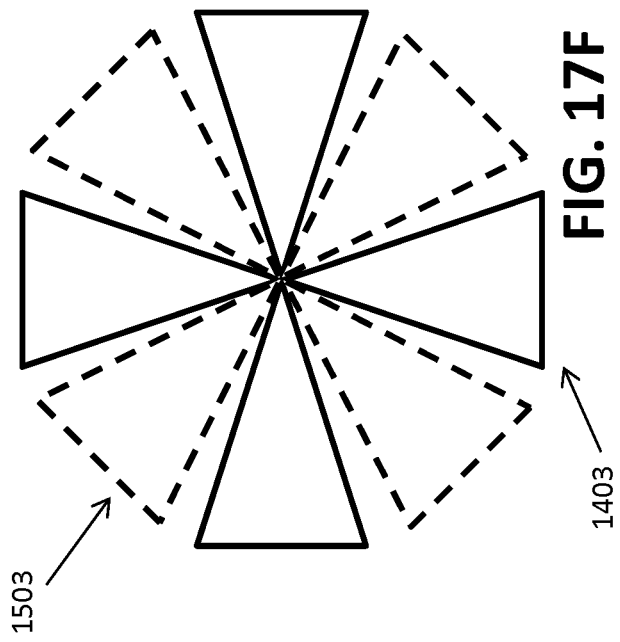
FIG. 17F shows a way of adding a third connected electrode (level 3 and with a voltage $V_2$ applied) which can be used additionally to the butterfly electrode and in a complementary way to control the field profile across the radial (lateral) direction of the lens.
Figure 17E:
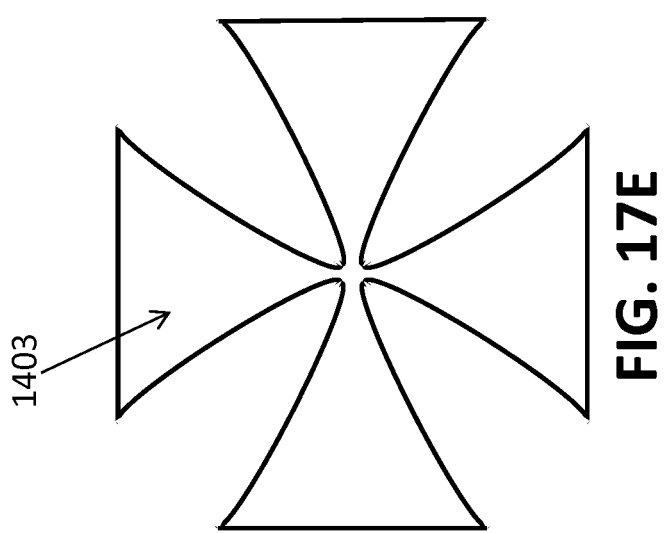
FIG. 17E shows another geometry employing capacitive coupling between neighboring concentric ring electrodes by using a double (with two axes) "Maltese-cross" connected electrode instead of using discrete capacitive bridges.

FIG. 17E schematically illustrates another embodiment according to which the capacitive coupling between neighboring concentric ring electrodes 1002 (at level 1) is achieved by using a crossed (two axes) or "Maltese-cross" connected (with voltage $V_1$) electrode structure 1403 (placed at level 2) instead of using discrete capacitive bridges 1203.

FIG. 17F illustrates adding a third connected electrode 1503 (level 3 and with a voltage $V_2$ applied) which can be used in addition to the butterfly electrode 1403 and in a complementary way to control the field profile across the radial (lateral) direction of the lens. In this way, the voltages $V_1$ and $V_2$ can be chosen to obtain a uniform electric field profile across the lens surface and thus a zero OP.

Figure 18A:
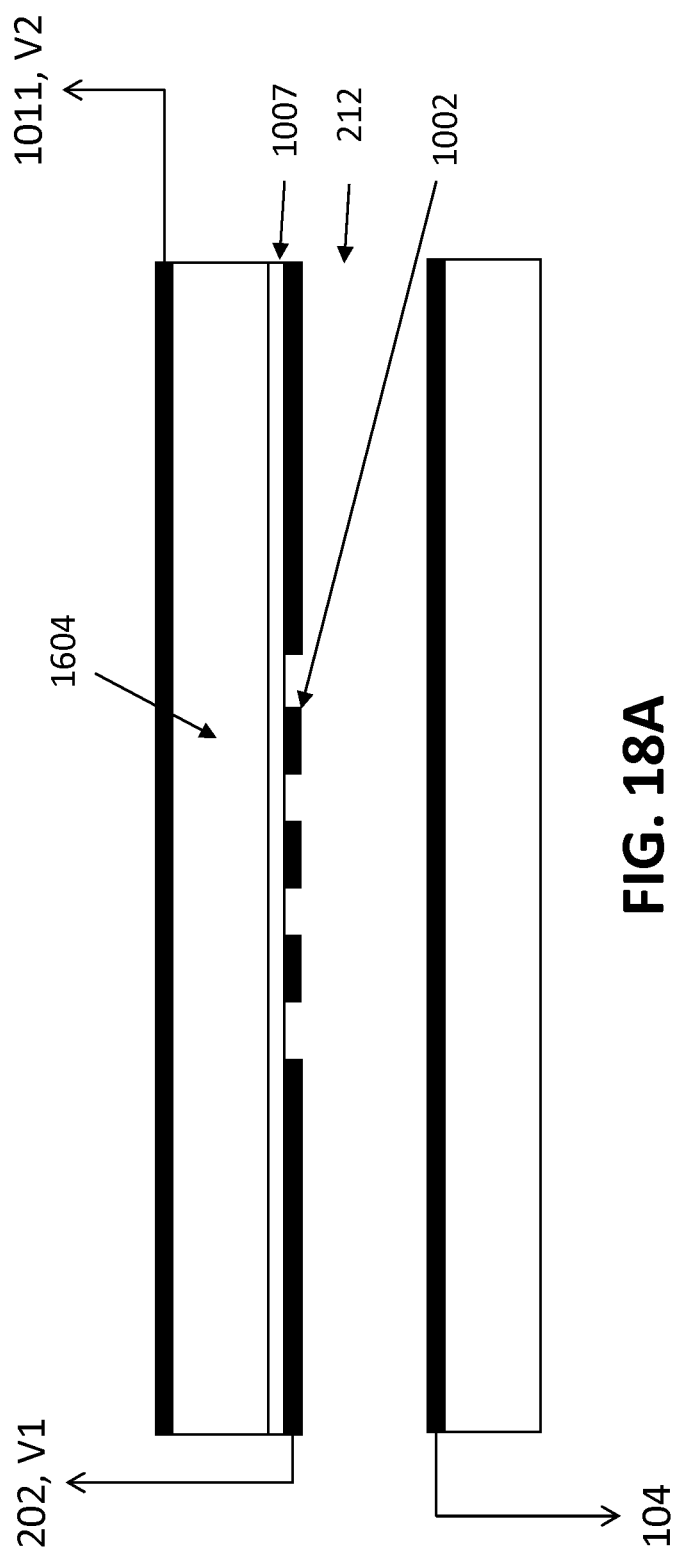
FIG. 18A shows another geometry employing capacitive coupling between neighboring concentric ring electrodes using a layer with high dielectric constant instead of a second level of concentric rings.
Figure 18B:
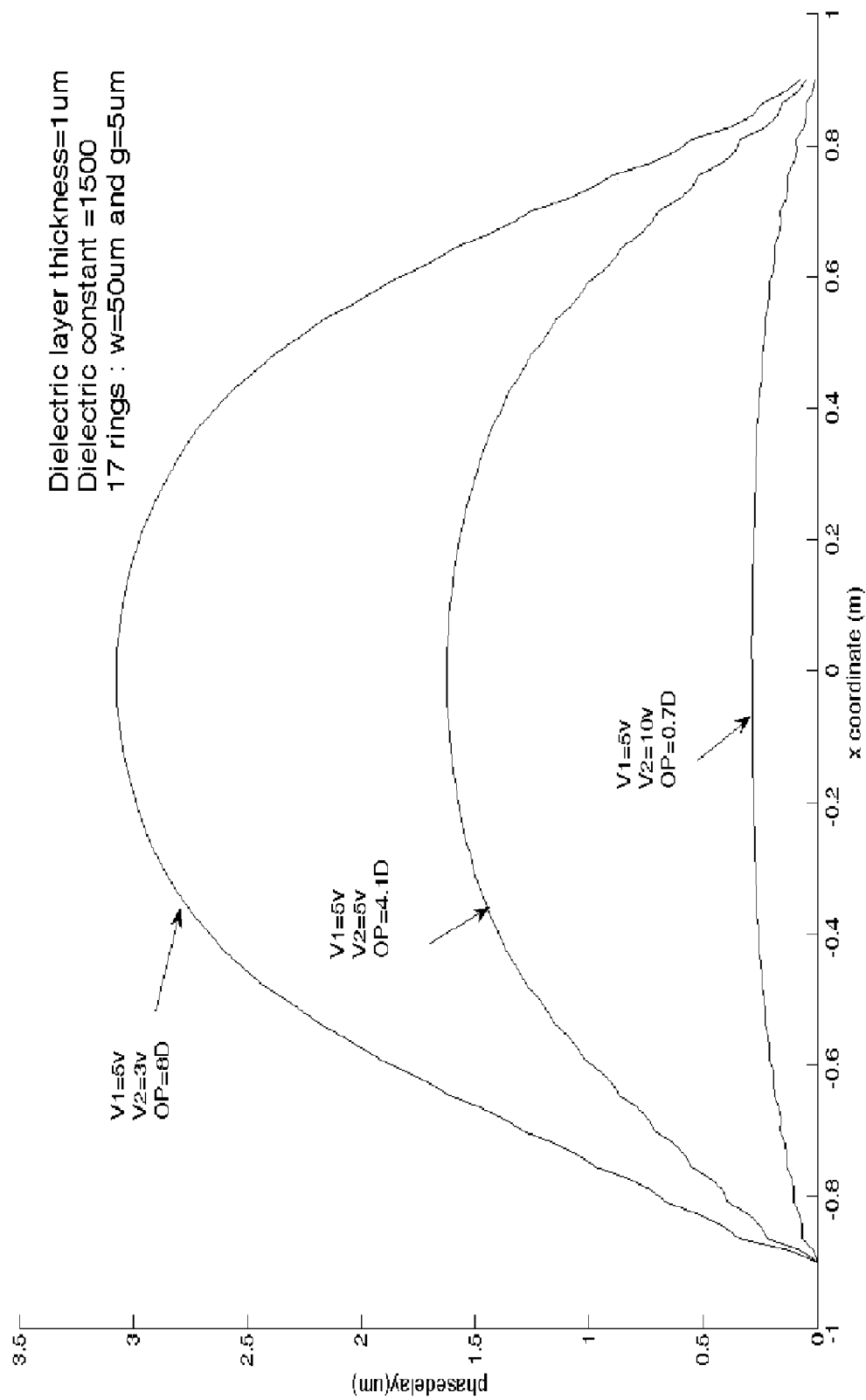
FIG. 18B shows confirmation of wavefronts versus the radial (lateral) coordinate for various optical power values by using the half lens described in FIG. 18A.

In yet another embodiment of the proposed solution, a high dielectric constant material 1604 is employed to replace one of the floating ring electrode layers 1003. As illustrated in FIG. 18A, the electric field control layer 1009 is composed only of one layer of floating multiple concentric ring electrodes 1002, covered by a material layer 1604 which has high dielectric constant. In this case, as it is shown (FIG. 18B) by simulations, a predetermined coupling of electrical potential between neighboring floating ring electrodes 1002 can be obtained by the choice of the number of rings, their relative distances (g), widths (w) and the thickness and the dielectric constant of the high dielectric constant layer 1604, to generate a desired wavefront, for various optical power levels, FIG. 18B.

Figure 18C:
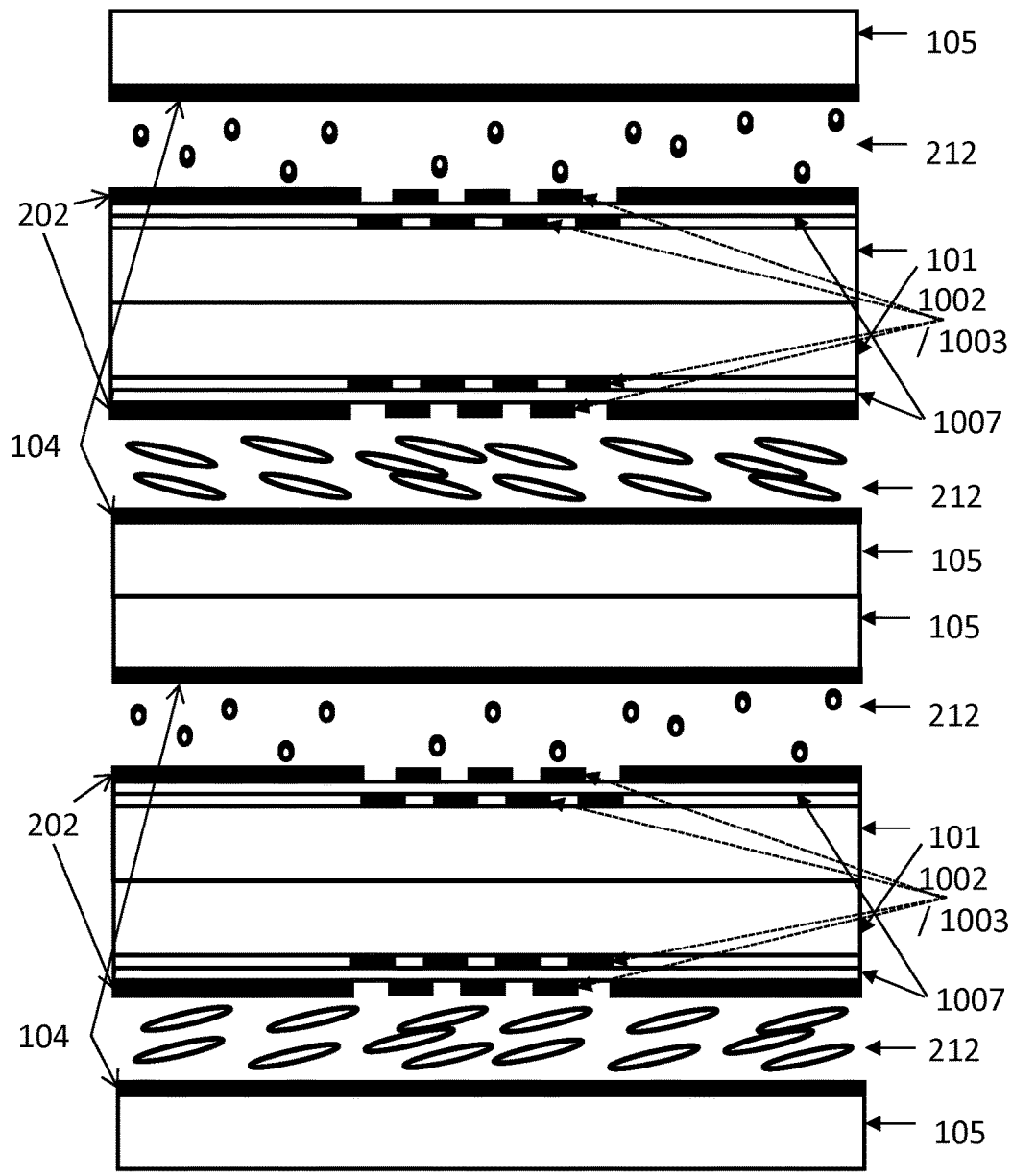
FIG. 18C shows a geometry of four LC cells, wherein four the liquid crystal cells arranged to provide two cells having parallel liquid crystal orientation directions of opposed direction for each of the linear polarizations.
Figure 18D:
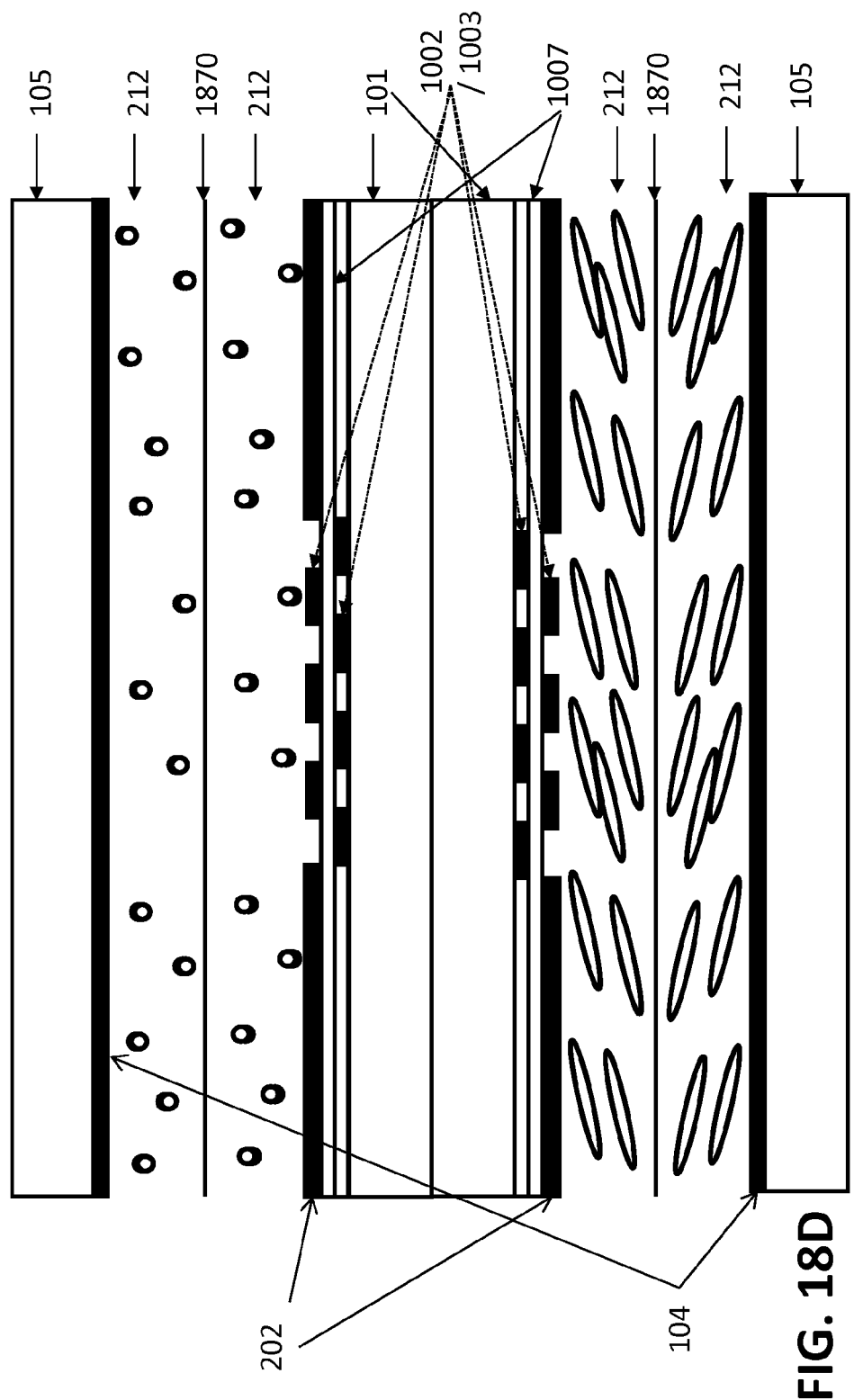
FIG. 18D shows a geometry of two LC cells, wherein each of the two cells having parallel liquid crystal orientation directions of opposed direction are separated by a thin stretched membrane and share a common the electrode structure arranged on an inside of the cell walls.

As illustrated in FIG. 18C, a device comprises four the liquid crystal cells arranged to provide two cells having parallel liquid crystal orientation directions of opposed direction for each of the linear polarizations, wherein the electrode structure is arranged on an inside of the cell walls, and is separately provided for each of the four liquid crystal cells. As illustrated in FIG. 18D, a device comprises two the liquid crystal cells, wherein each of the two cells having parallel liquid crystal orientation directions of opposed direction are separated by a thin stretched membrane 1870 and share a common the electrode structure arranged on an inside of the cell walls.

In accordance with another embodiment of the proposed solution, additional circumferential segmentation of connected 202 (FIG. 19A) and floating (FIGS. 19B and 19C) electrode structures 1002/1003 is proposed to generate non-centro-symmetric, asymmetric, aspheric, tilted, etc. forms of wavefront for various applications such as additional aberration correction, tilt or optical image stabilization. While four subsegments are illustrated, the invention is not limited thereto, six, eight or more subsegments can be employed to provide optical image stabilization and aberration control. An appropriate optical image stabilization controller responds to image characteristics of the optical field passing through the LC lens and provides instructions to corresponding signal drivers for each subsegment. Further description is provided in US Patent Application US 2012/0257131 claiming priority from U.S. Provisional Patent Application Ser. No. 61/289,995 filed Dec. 23, 2009, the entireties of which are incorporated herein by reference.

In accordance with another embodiment of the proposed solution, parallel orientation of connected 202 and floating electrode structures 1002/1003 is proposed (instead of concentric ring structures) to generate "cylindrical" lens type single or arrayed devices for lensing, 2D to 3D television, etc.

In accordance with yet another embodiment of the proposed solution the use of subsequent lithography process is proposed to fabricate the two layers of floating and capacitively coupled multiple concentric ring electrodes 1002/1003. Depending upon the manufacturing approach adopted (single middle glass 1001 or separate glasses 101) this lithography process can be applied to one or two surfaces of glass substrates. A nonrestrictive example of corresponding manufacturing process can start by using a substrate (glass, polymer, ceramics, etc.) bearing an index matched uniform ITO, that is then etched (wet or dry) or laser ablated or otherwise patterned and is then covered by an intermediate material layer of specific thickness (e.g., several hundreds of nanometers) and specific dielectric constant. Then another transparent conductive electrode layer is deposited either in the patterned form or uniformly and then is patterned.

Bipolar Capacitive Coupled Lens

Without limiting the invention, in the above described embodiments the variability of the optical power is unipolar, i.e. either negative optical power or positive optical power.

Figure 21:
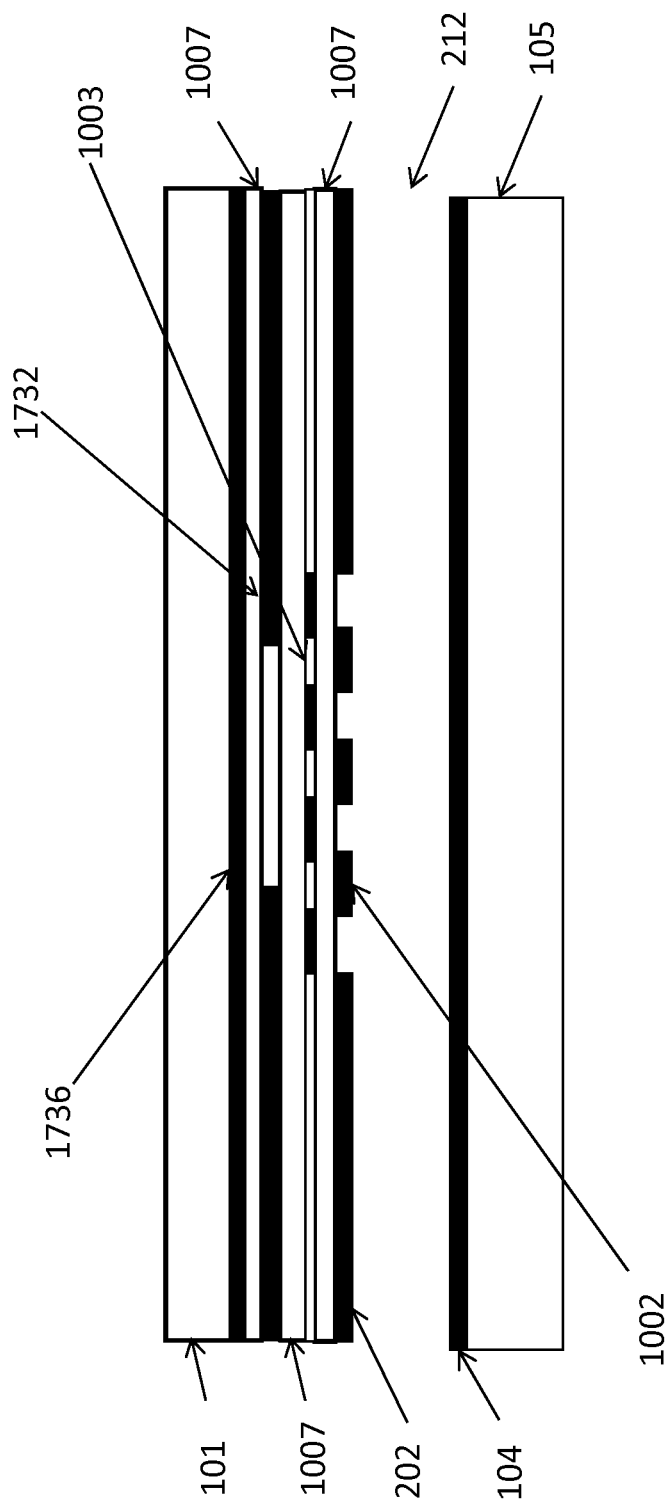
FIG. 21 schematically illustrates another bipolar liquid crystal lens geometry in accordance with another embodiment of the proposed solution.

In accordance with another embodiment of the proposed solution, the optical power tuning range of a capacitively coupled LC lens 1700 can almost be doubled by employing and splitting the top Uniform Control Electrode (UCE) 1011 into a Hole Patterned Electrode (HPE2) 1732 and a Control Disc Electrode (CDE) 1734 which are on the same substrate surface, as schematically illustrated in FIGS. 20A and 20B, or HPE2 1732 and UCE 1736 on different substrate surfaces, as schematically illustrated in FIG. 21.

Figure 22:
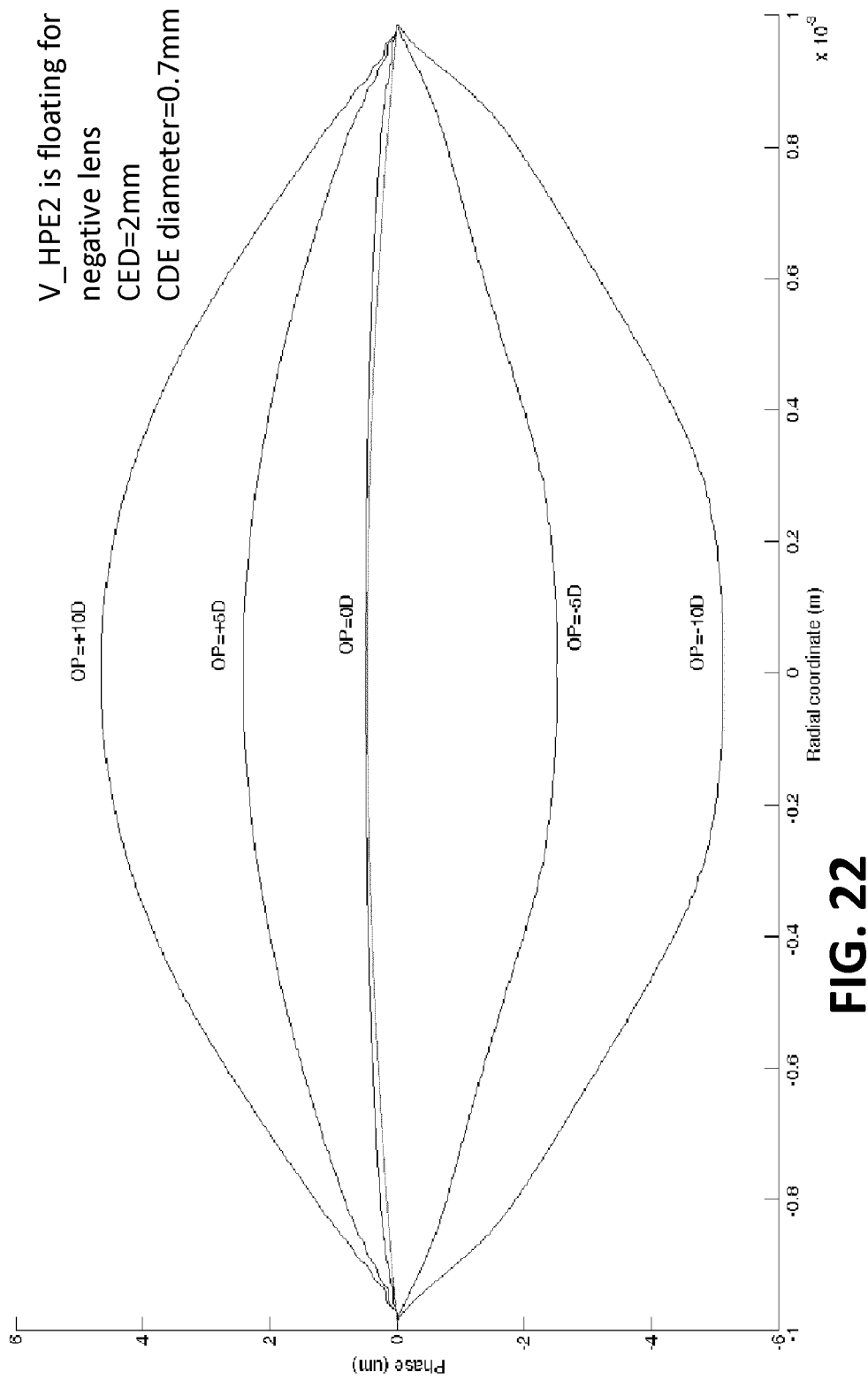
FIG. 22 is a schematic plot illustrating optical power variability across the aperture in accordance with the proposed solution.

These geometries provide bipolar functionality of the LC lens 1700, from negative to positive optical power and vice versa as schematically illustrated in FIG. 22. The diameter of the HPE2 1732 is smaller than that of HPE1 202 illustrated in FIG. 13A and FIG. 15A. The driving method includes:

For positive OP tuning the V_CDE=V_HPE2 is smaller than the V_HPE1

For negative OP tuning the V_CDE is bigger than the V_HPE1, and V_HPE2 is kept either floating or with biased voltage V_HPE1≤V_HPE2≤V_CDE.

Cylindrical Lens, Beam Shaping, Beam Steering and Beam Control Optical Devices

Many modern devices would benefit greatly if these had the capacity of dynamic light steering without mechanical movement. Examples include: imaging, 3D projection, LED lighting, solar concentrators, etc. Liquid crystal devices have been shown as good candidates for such beam control.

Figure 24B:
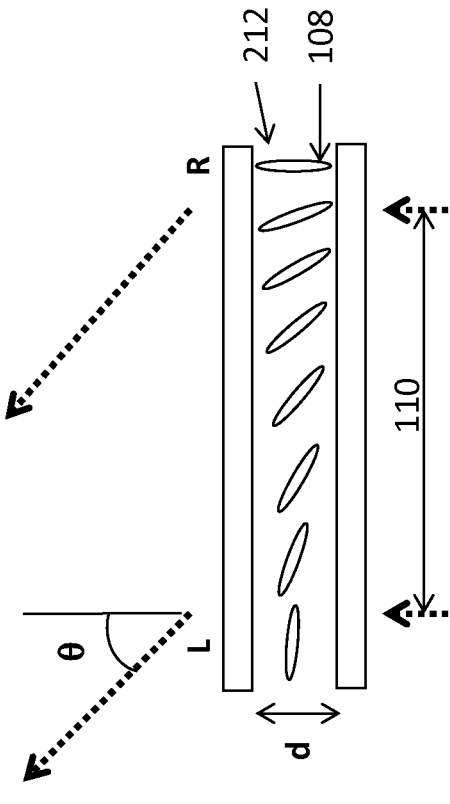
FIGS. 24A and 24B are schematic diagrams showing prior art refractive index gradient induced beam steering.
Figure 24A:
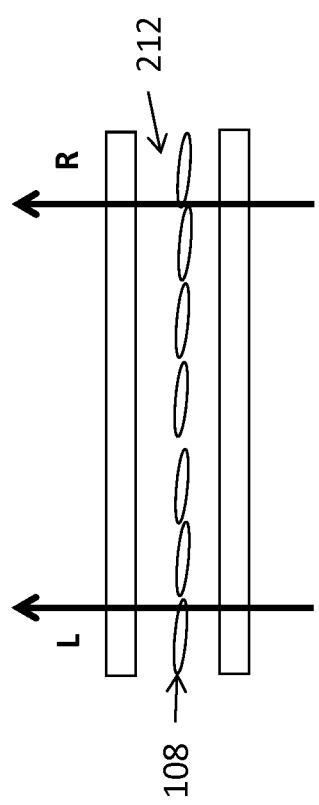

Prior art attempts at providing beam control include a liquid crystal prism based on refractive or diffractive principles. An example of a basic element for such steering is presented in FIG. 23A. FIG. 24A shows a uniform liquid crystal molecular director orientation distribution across the aperture in a ground state (non-excited state). With the liquid crystal molecules (ellipses 108) being aligned uniformly, the left (L) and right (R) rays undergo similar phase delays and there will be no steering effect. If a potential difference $V_1 < V_2$ is applied to the geometry illustrated in FIG. 23A, an electric potential drop is experienced by the liquid crystal molecules across the aperture (110) as shown in FIG. 23B. FIG. 24B shows a corresponding liquid crystal molecular alignment gradient. In this case the left side ray undergoes more delay than the right side ray. If the liquid crystal has positive dielectric anisotropy and if the polarization of light is in the plane of drawing. This differential phase delay will force the incident beam to tilt (like a prism).

The degree of tilt may be estimated by using the following simplified formula (electrically variable refractive tilt limit):

$$\theta(\deg) \approx (180/\pi) \Delta n \, d/CA$$

where $\Delta n$ is the difference in refractive index between the left (L) and right (R) corners of the prism.

By positioning the electrodes $V_1$ and $V_2$ far enough from the liquid crystal layer 112 and the bottom uniform ITO electrode (see the thickness H of the top substrate), acceptable (smooth) gradient can be obtained to perform the steering operation. The distances between top two electrodes (102A & 102B) defines the clear aperture and the distance between the top (102A & 102B) and bottom (104) electrodes defines the profile of the electric field. Two problems can be pointed out for this geometry: the far position of electrodes increases the voltages required and the positions of electrodes 102A & 102B define a fixed clear aperture.

Figure 2:
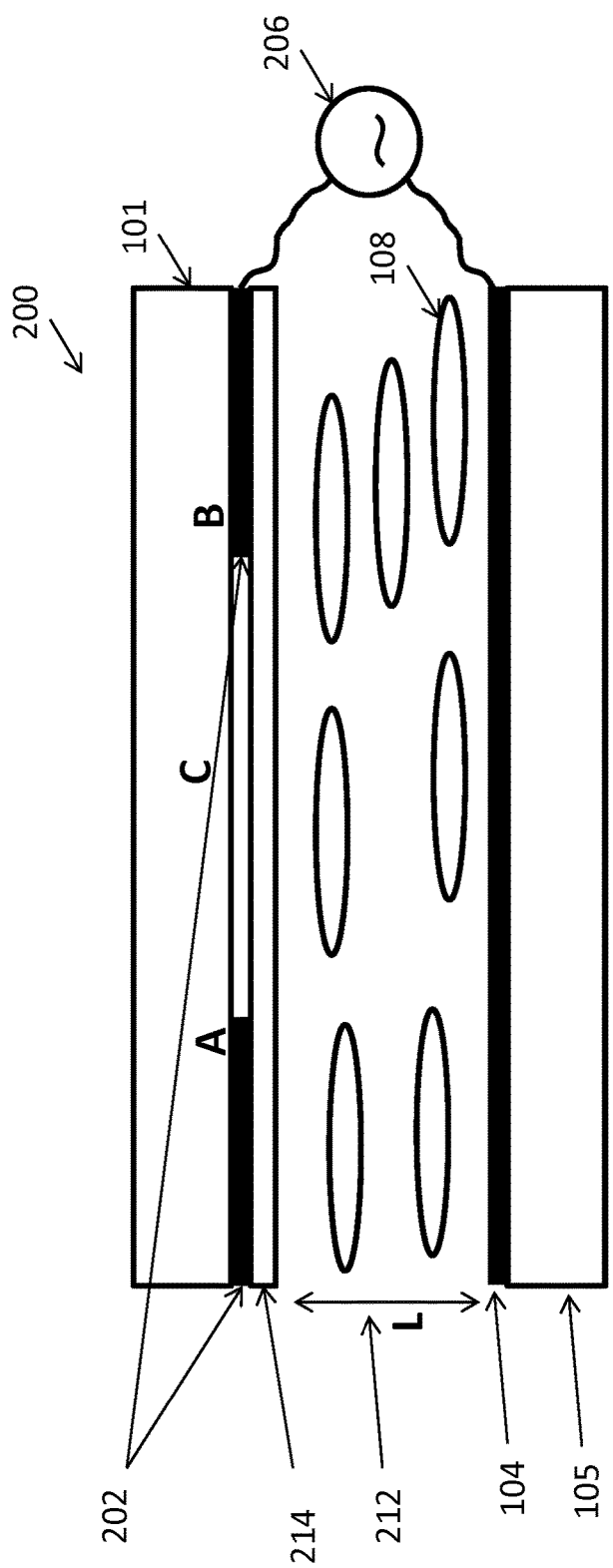
FIG. 2 is a schematic representation of a prior art liquid crystal lens (with polarization dependence; "half" lens) using a high resistivity or weakly conductive layer coated internally with respect to the LC cell hole-patterned electrode in combination with a transparent uniform electrode and driven with one variable voltage, $V_1$ and frequency F.
Figure 3:
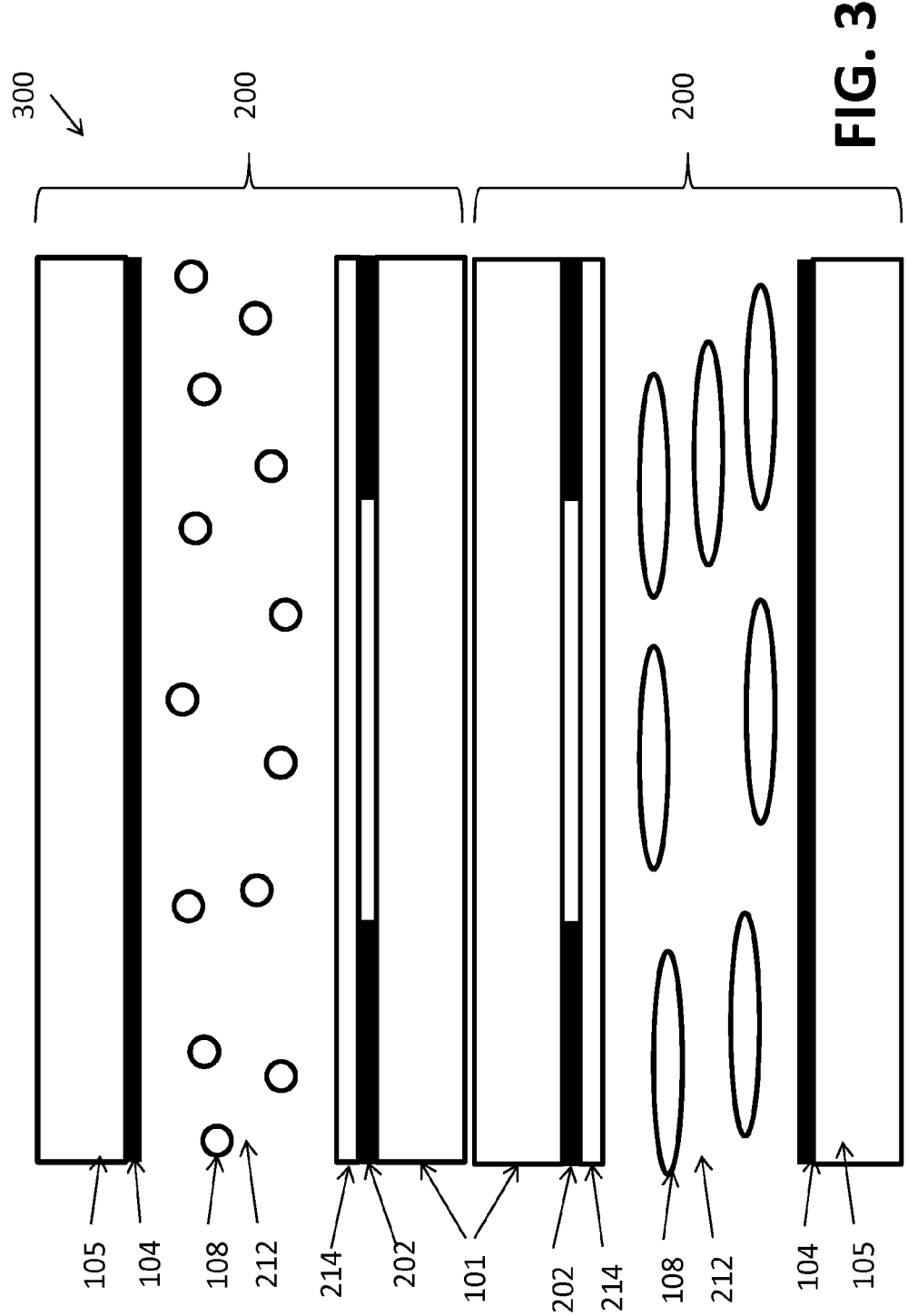
FIG. 3 is a schematic representation of a liquid crystal lens without polarization dependence ("full" lens) by means of two 90° rotated LC lenses described in FIG. 2, using two weakly conductive layers.
Figure 4:
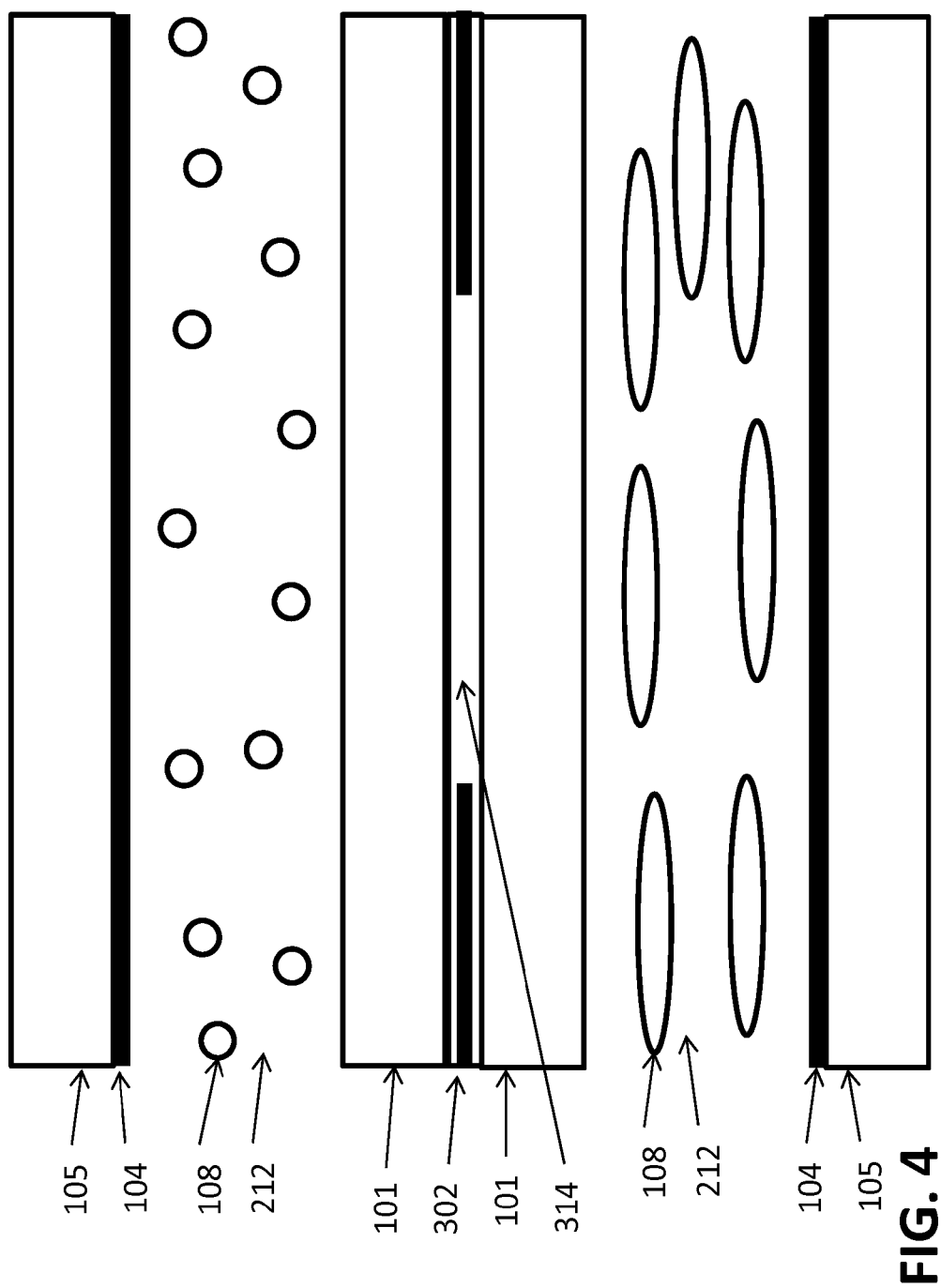
FIG. 4 is a schematic representation of an alternative liquid crystal lens without polarization dependence ("full" lens) by using only one weakly conductive layer.
Figure 5:
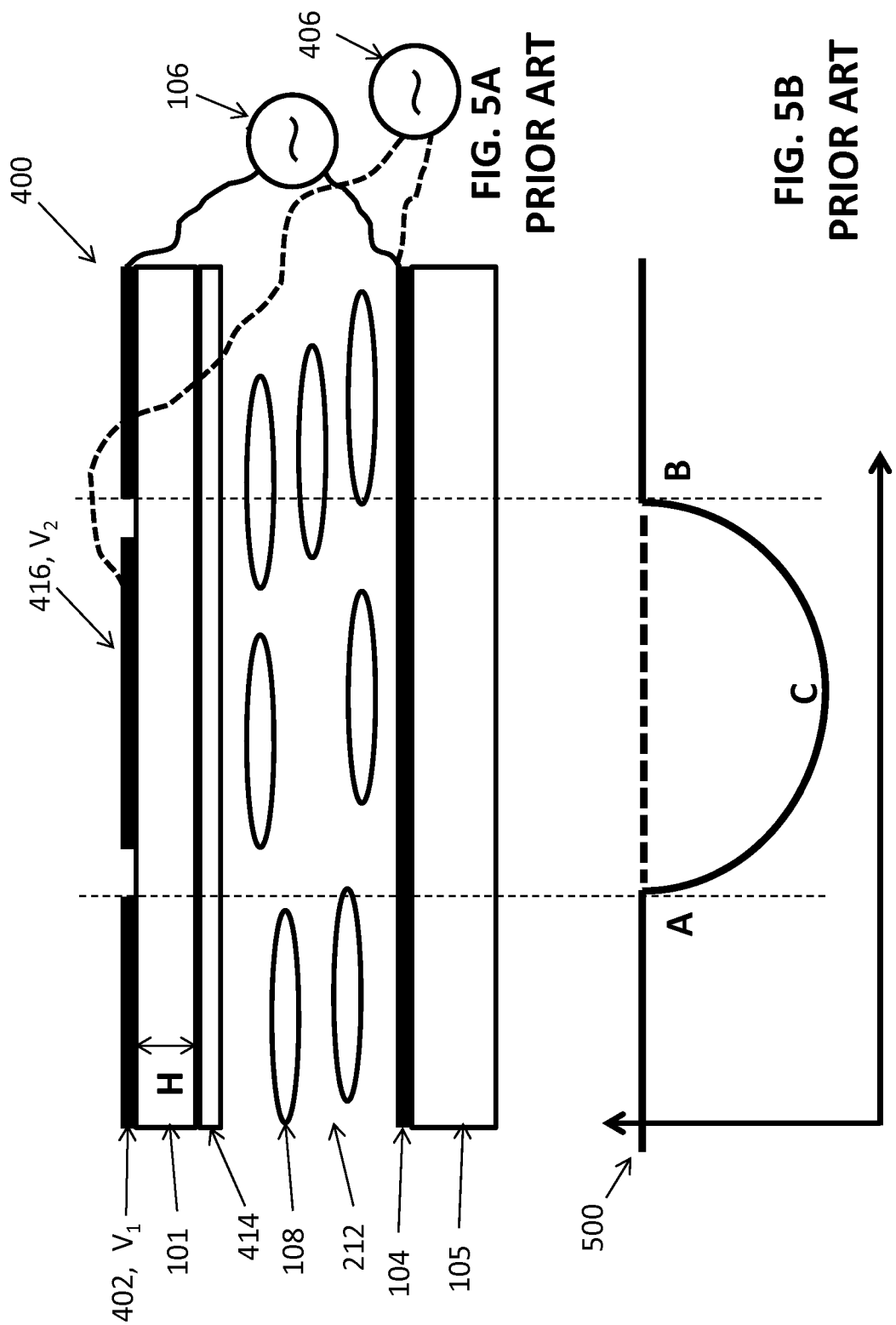
FIG. 5A is a prior art schematic representation of an alternative liquid crystal lens (with polarization dependence; "half" lens) by using an additional disc shaped electrode and two variable voltages $V_1$ and $V_2$ to control the lens.
FIG. 5B is a prior art schematic representation of the electric potential profile when only the hole-patterned electrode is activated (solid curve) and when the disc shaped electrode also is activated similarly (solid and dashed horizontal lines), $V_1=V_2$.
Figure 6:
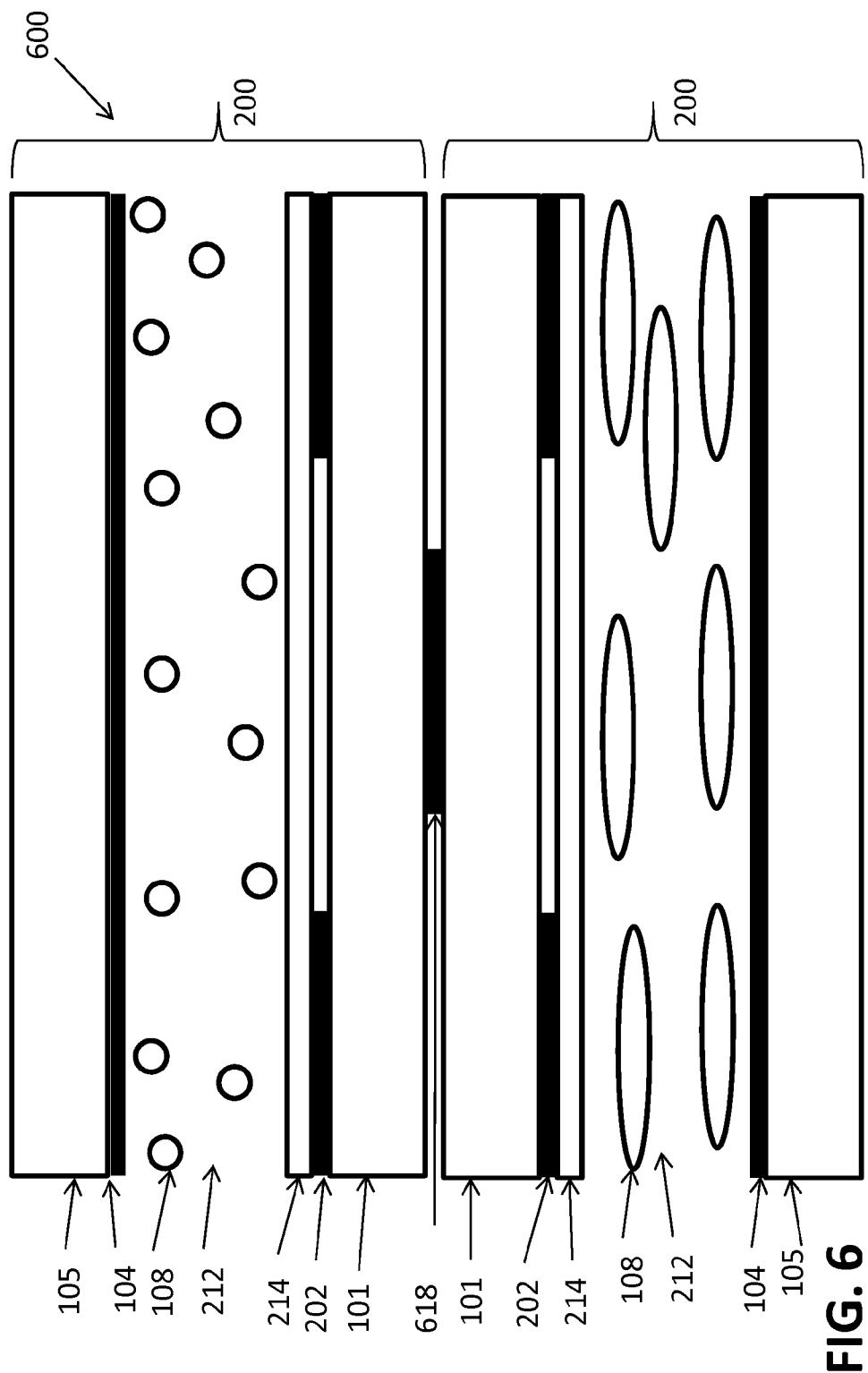
FIG. 6 is a schematic representation of the polarization independent LCL full lens using one common floating conductive layer correcting the light wavefront.
Figure 9:
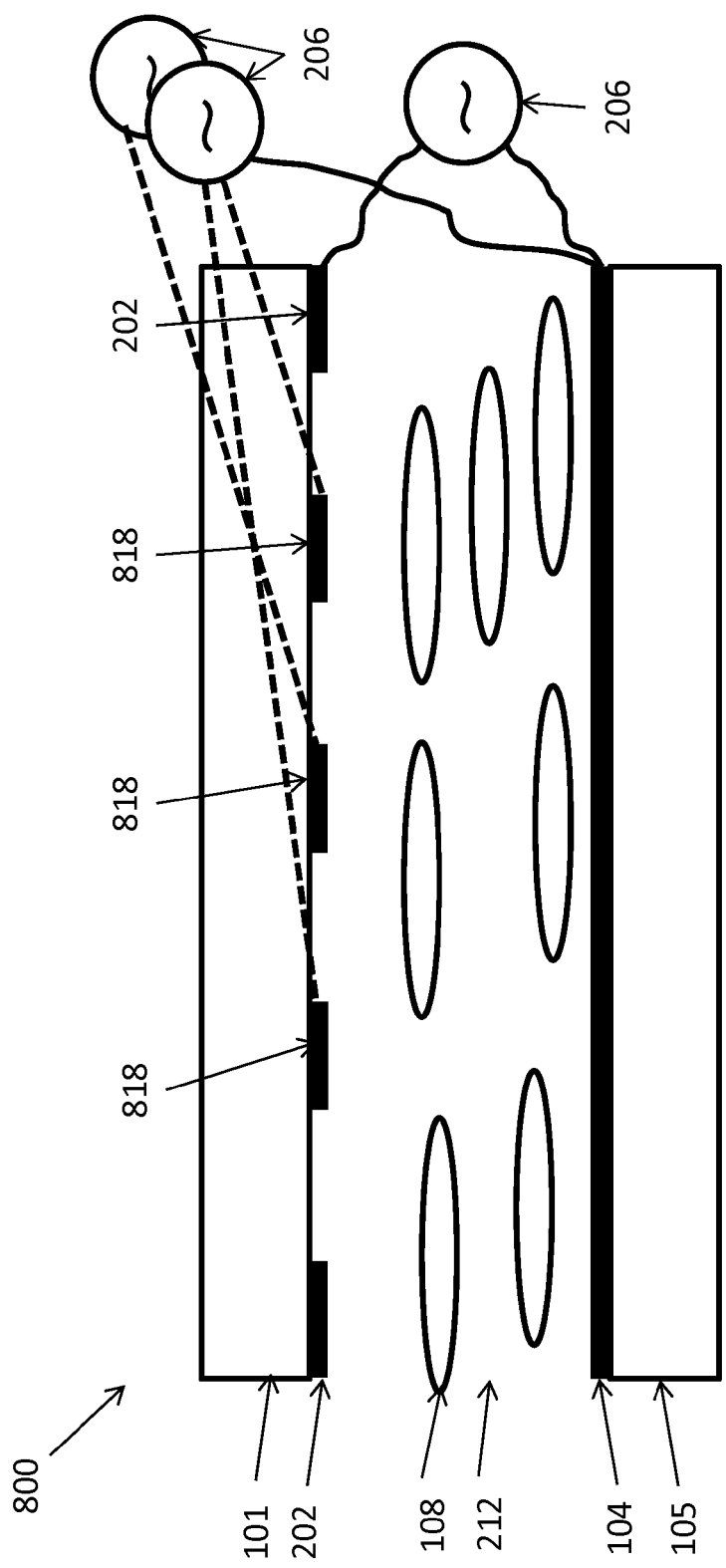
FIG. 9 is a schematic representation of the polarization dependent LCL ("half" lens) using multiple transparent concentric ring electrodes which are connected to power supplies and are individually controlled.
Figure 25:
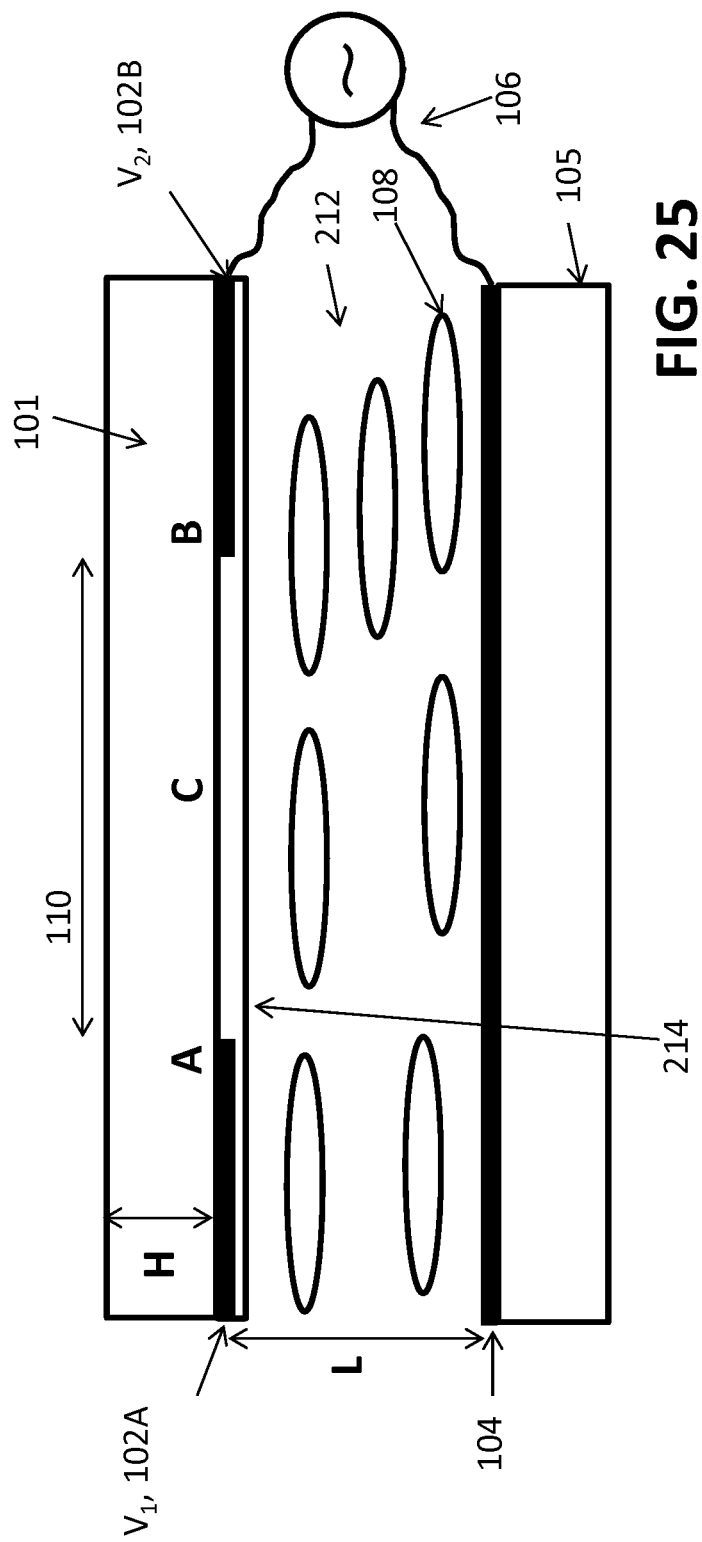
FIG. 25 is a prior art attempt at reducing required voltages beam steering optical device.

Similarly to the prior art solution shown in FIG. 2A for LCLs, the required voltages may be significantly reduced if the electrodes 102A & 102B in the beam steering control geometry are brought into the liquid crystal cell (closer to the bottom uniform electrode) as shown in FIG. 25. However, to avoid abrupt spatial changes of the electric potential and field variations, a Weakly Conductive Layer (WCL) 214 must be deposited over the electrodes 102A & 102B. However such WCLs 214 (typically semiconductors) are difficult to produce in a reproducible way because the required sheet resistances are typically within the percolation zone of the material and manufacturing variations in parameters noticeably change the sheet resistance. As a result yield drops and cost increases.

An alternative approach was proposed along the lines of the geometry shown in FIGS. 7 and 8 LCLs 700, while employing linear electrodes instead of centro-symmetric electrodes, wherein multiple linear electrodes are interrelated by precisely designed resistive bridges 720. Some of intermediate electrodes may be additionally actively controlled. However, the manufacturing of such structures is also very difficult.

Figure 26:
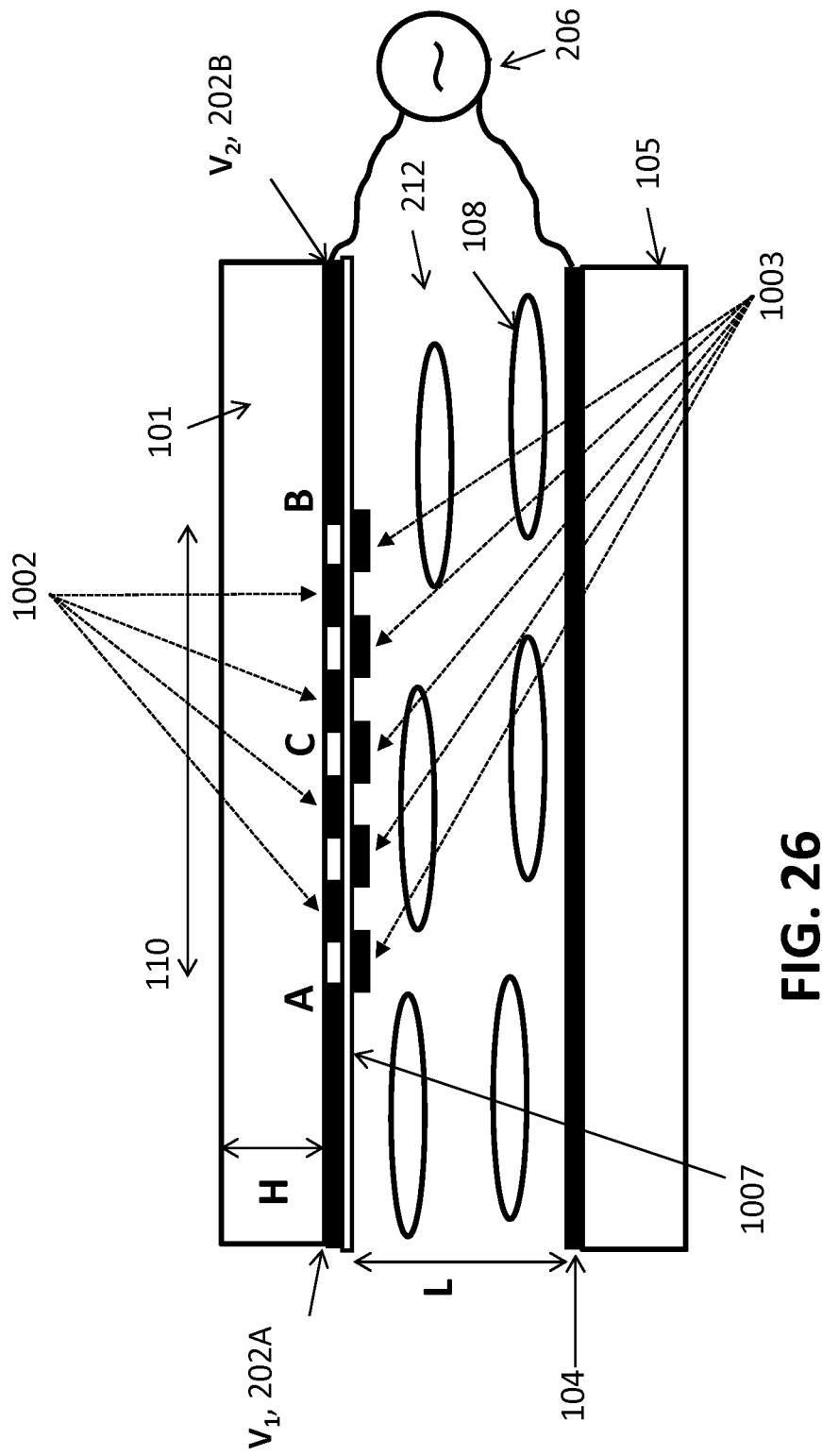
FIG. 26 is a schematic diagram illustrating a geometry of a beam steering device in accordance with the proposed solution.

In accordance with the proposed solution, the use capacitive coupling between linear electrode structures is proposed, with two linear electrode structures being deposited and etched at two different levels, separated by an isolation or insulation layer as illustrated in cross-section in FIG. 26. For brevity it is pointed out that the cross-sectional view illustrated in FIG. 26 has visual and operational similarities with FIG. 13A except that each electrode segment, illustrated in cross-section, is linear extending in the direction perpendicular to the cross-section and the HPE electrode 202 of FIG. 13A is replaced by two electrodes 202A & 202B to which voltages $V_1$ & $V_2$ are applied respectively. The principles of operation described with respect to FIG. 13A apply, due to the geometry differences a gradual drop in electric potential is experienced by the liquid crystal molecules. For certainty the layer geometries proposed for LCL optical devices apply mutatis mutandis to cylindrical lenses, beam steering devices, beam control devices, beam shaping devices, etc. wherein the subject matter illustrated in cross-section in FIGS. 10, 11, 12, 13A, 13B, 13C (with respect to cylindrical lens optical power), 13D (with respect to cylindrical lens optical power), 13E (with respect to cylindrical lens optical power), 13F (with respect to cylindrical lens optical power), 14A, 14B, 15A, 15B (with respect to cylindrical lens optical power), 15C (with respect to cylindrical lens optical power), 15D (with respect to cylindrical lens optical power), 16A, 16B, 18A, 18B (with respect to cylindrical lens optical power), 20B, 21 and 22 (with respect to cylindrical lens optical power).

Figure 27:
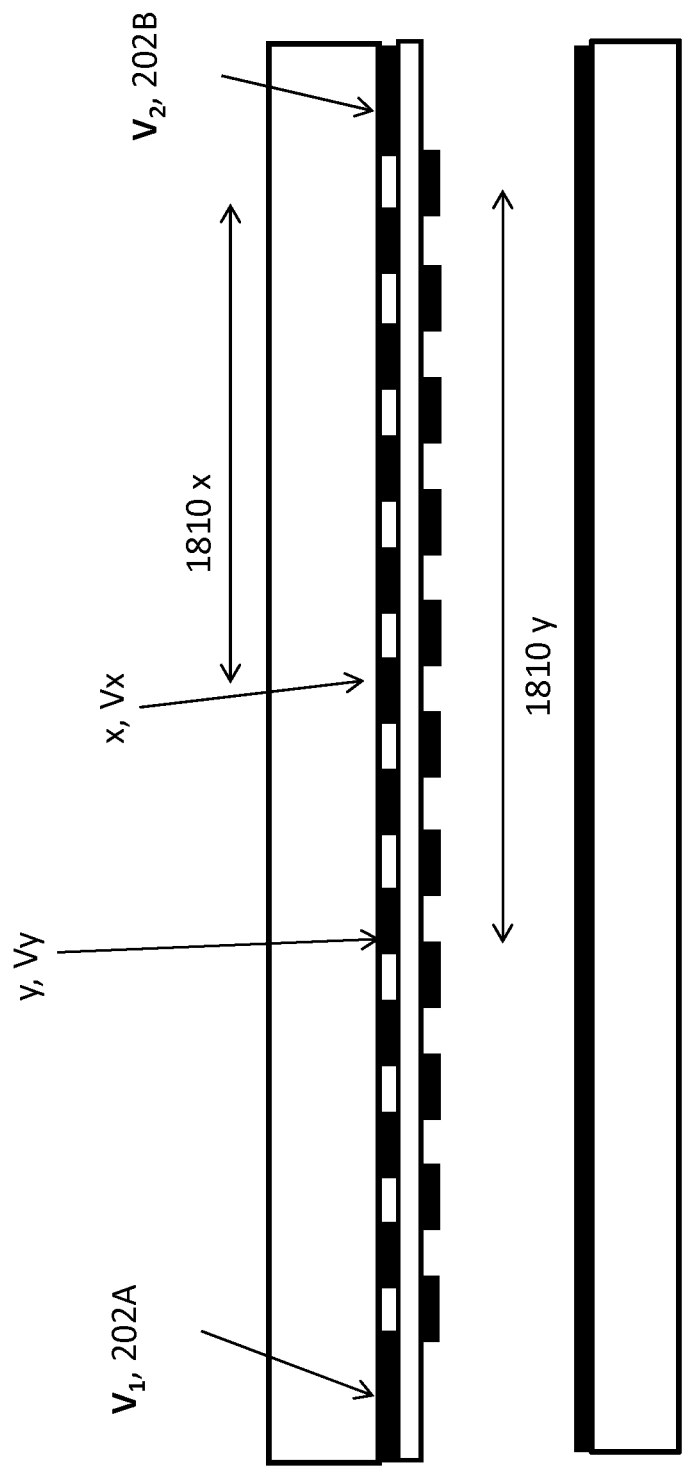
FIG. 27 is a schematic diagram illustrating in accordance with the proposed solution a cylindrical lens having a variable aperture.

Returning to beam steering devices in particular, the extreme left 202A and right 202B electrodes having "imposed" electrical potentials potential drop will be distributed between them. In accordance with another embodiment of the proposed solution, a variable clear aperture 1810 can be provided by actively controlling intermediate electrodes (instead of being floating while being capacitively coupled) across the clear aperture 1810. That is, for the given geometry and materials used, the distance across the clear aperture 1810 between electrodes 202A & 202B illustrated in FIG. 27 over which the electric potential is attenuated is selected by selecting a sequence of linear electrode starting from one of the side electrodes 202A or 202B which is activated at the same potential as that side electrode. With reference with to FIG. 27, if only electrodes 202A and 202B are driven then the clear aperture 1810 extends between electrodes 202A and 202B; if electrode 202A and electrode y are driven at the same potential V1 while electrode 202B is driven at potential V2 then the clear aperture 1810Y extends between electrode y and electrode 202B; and if electrodes 202A, y and x are driven at V1 while electrode 202B is driven at V2 then the clear aperture 1810X extends between electrodes x and 202B. Alternatively, the clear aperture can be chosen after fabrication of the device, and, most importantly, the available optical anisotropy of the LC material can be spread (and used adequately) over the desired clear aperture 1810.

Figure 28:
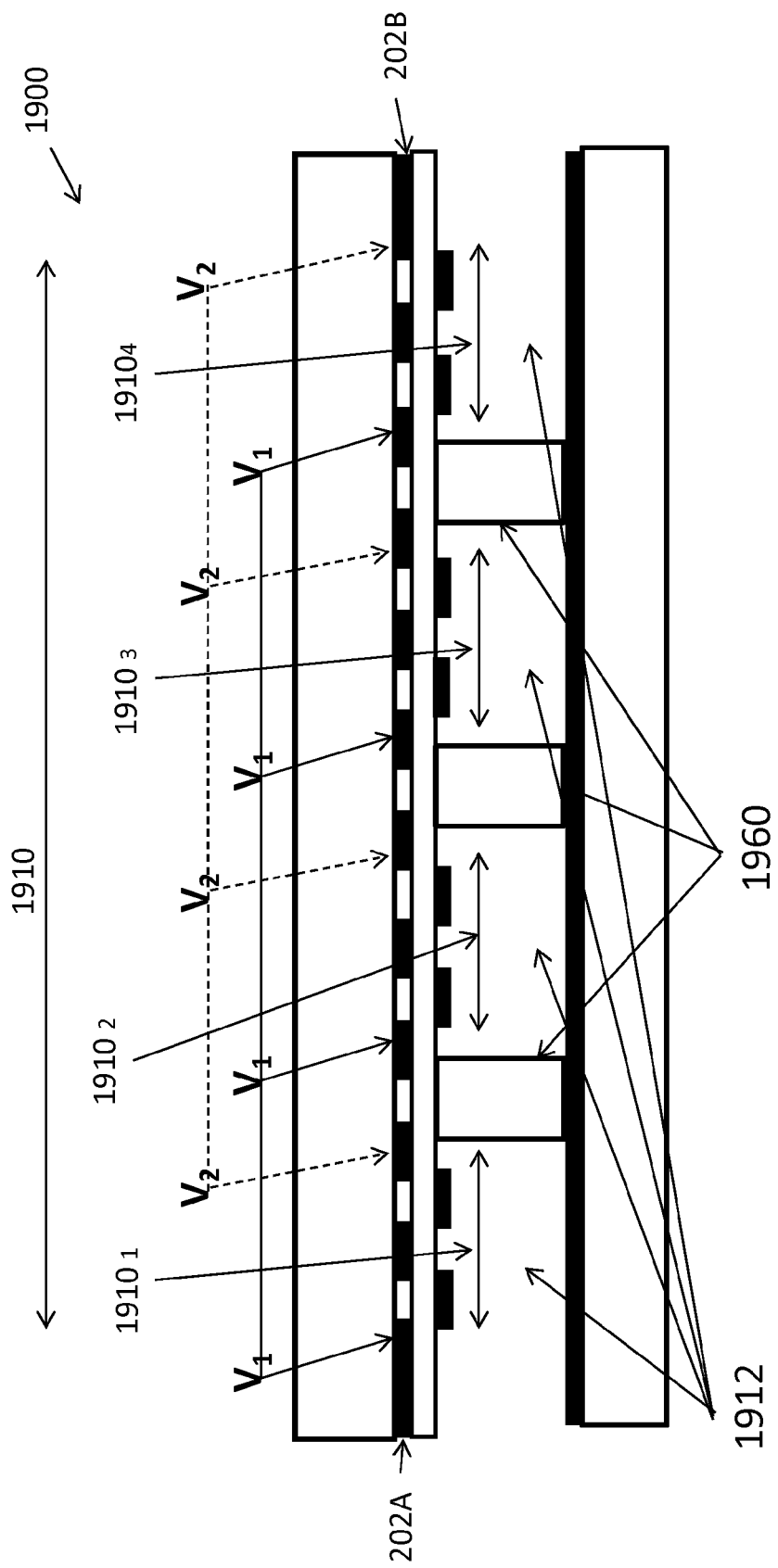
FIG. 28 is a schematic diagram illustrating a variant of a geometry of a beam steering device as illustrated in FIG. 26 having a larger aperture in accordance with the proposed solution, wherein similar labels refer to similar features.

Two operational parameters act against each other. A larger clear aperture 1810 is desired in order to increase incident light throughput, however for the same layer thicknesses a larger distance between electrodes 202A & 202B illustrated in FIG. 26 results in a more gradual electrical field drop between electrodes 202A & 202B and therefore according to the equation above in a lower maximum steering angle. An increase in the steering angle is possible between closer electrodes 202A & 202B however at the price of a lower light throughput. In accordance with the proposed solution, FIG. 28 illustrates a beam steering device 1900 composed of a number of LC areas 1912 operating in unison to provide large clear aperture 1910 at an increased beam steering angle. In particular, aside from the side linear electrodes 202A and 202B, additional linear electrodes across the aperture 1910 are driven with the same voltages $V_1$ & $V_2$ in a pattern as illustrated in FIG. 28. A number of capacitively coupled linear electrodes are employed between the driven linear electrodes. The closer spacing between the driven linear electrodes in each LC area 1912 provides the increase in the beam deviation angle. It is recognized that the driven electrodes also create sharp voltage differences between LC areas 1912. In order to mitigate light dispersion in these interstitial regions, optional walls 1960 can be employed. The walls 1960 can be transparent or light absorbing, without limiting the invention thereto.

While the above embodiments describe essentially configurations in which the liquid crystal aligns with the electric field, dual frequency liquid crystal arrangements are known that provide for aligning liquid crystal with the electric field at one range of frequencies, and aligning liquid crystal to be orthogonal with the electric field at another range of frequencies. In some cases, a faster operation is achieved by using certain frequencies to return the orientation of the liquid crystal near to the ground state.

The invention claimed is:
1. A liquid crystal lens or optical device comprising:
a liquid crystal cell having:
cell walls having alignment surfaces;
a liquid crystal material in contact with the cell walls;
an electrode structure having:
a plurality of capacitively coupled electrode segments separated by at least one insulating layer, and providing a transparent aperture;
an opposed electrode;
wherein an electric field can be provided between the electrode segments and the opposed electrode within the liquid crystal cell;
wherein said plurality of capacitively coupled electrode segments are divided into first segments and second segments separated on two layers separated by an insulation layer applied over said first plurality of capacitively coupled electrode segments;
wherein a voltage applied to a first segment of the plurality of segments induces a reduced voltage in one or more subsequent capacitively coupled segments of said plurality of segments;
wherein the arrangement of said segments corresponds to a desired electric field spatial profile across an aperture of the liquid crystal cell, and
wherein said insulating layer allows said desired electric field spatial profile to be essentially invariant as a function of a frequency of a control signal applied to said first segment of the plurality of segments.

2. A device as claimed in claim 1, wherein said optical device is a cylindrical lens, said electrode structure comprising strips of substantially parallel electrode segments and said first capacitively coupled electrode segment comprising outer ones of said parallel electrode segment strips.

3. A device as claimed in claim 1, wherein said optical device is a liquid crystal lens, said electrode structure comprising a substantially circular aperture and said plurality of capacitively coupled electrode segments comprising a plurality of substantially concentric capacitively coupled electrode segments.

4. A device as claimed in claim 3, wherein each capacitively coupled electrode segment further comprises circumferential subsegments for providing wavefront control via said optical device, preferably further comprising a controller configured to provide time-varying adjusted voltages to said subsegments for optical image stabilization.

5. A device as claimed in claim 1, wherein said first segments and said second segments separated on two layers are separated by a high dielectric constant layer applied over said first plurality of capacitively coupled electrode segments.

6. A device as claimed in claim 1, wherein each electrode segment of the second plurality partially overlap adjacent electrode segments of the first plurality thereof.

7. A device as claimed in claim 1, wherein said electrode structure comprises one of:
a dielectric substrate over a substantially flat transparent electrically conductive electrode layer; and
an insulation layer over a substantially flat transparent conductive electrode layer.

8. A device as claimed in claim 1, wherein said first segment for receiving said voltage comprises one of:

a butterfly shaped connected transparent electrode partially overlapping each other electrode segment, said partial overlap varying gradually with aperture position; and
a first Maltese-cross shaped connected transparent electrode partially overlapping each other electrode segment.

9. A device as claimed in claim 8, wherein said electrode structure comprises a second Maltese-cross oriented complementary to said first Maltese-cross.

10. A device as claimed in claim 7, wherein said substantially flat transparent electrically conductive layer further comprises a hole patterned electrode and a disc shaped electrode within the hole patterned electrode for bipolar operation of said optical device.

11. A device as claimed in claim 1, comprising two said liquid crystal cells arranged to act on both linear polarizations of light, said electrode structure being arranged to provide said desired electric field spatial profile across the aperture of said two liquid crystal cells.

12. A device as claimed in claim 11, comprising four said liquid crystal cells arranged to provide two cells having parallel liquid crystal orientation directions of opposed direction for each of said linear polarizations.

13. A device as claimed in claim 12, wherein said electrode structure is arranged on an inside of said cell walls, and is separately provided for each of said four liquid crystal cells.

14. A device as claimed in claim 12, wherein each of said two cells having parallel liquid crystal orientation directions of opposed direction are separated by a thin stretched membrane and share a common said electrode structure arranged on an inside of said cell walls.

15. A device as claimed in claim 1, further comprising an electrode covering at least a central part of said aperture for creating an electric field separately from said electrode segments.

16. A device as claimed in claim 1, wherein said insulating layer provides a small amount of conductivity and allows said desired electric field spatial profile to be essentially controlled as a function of a frequency of a control signal applied to said first segment of the plurality of segments.

17. A device as claimed in claim 1, further comprising a drive signal controller configured to provide at least one variable electrical signal of a predetermined voltage and frequency selected according to a desired variable optical property of the device, wherein preferably frequency is used to control an optical property of the device.

18. A device as claimed in claim 1, wherein the device is a tunable lens.

19. A device as claimed in claim 1, wherein said device has a flat, planar geometry.

20. A device as claimed in claim 11, wherein said electrode structure is arranged on an inside of said cell walls, and is separately provided for each of said two liquid crystal cells.

21. A device as claimed in claim 1, wherein the device includes a pattern of liquid crystal elements providing beam shaping.

22. A device as claimed in claim 2, wherein the device includes a pattern of liquid crystal elements providing beam shaping.

23. A device as claimed in claim 22, wherein the beam shaping device further comprises a variable aggregate clear aperture including selectively controlled intermediate electrode segments across the aggregate clear aperture wherein at least one liquid crystal prism element is configured to include adjacent pairs of driven first segments.

24. A device as claimed in claim 22, wherein the beam shaping device further comprises a variable aggregate clear aperture including one of transparent and light absorbing liquid crystal cell walls between adjacent liquid crystal prism elements to mitigate sharp voltage drop differences between said adjacent liquid crystal prism elements providing operation at increased beam deviation angles.

25. A device as claimed in claim 1, wherein the device includes at least one pattern of liquid crystal elements configured to provide beam broadening.

26. A liquid crystal lens or optical device comprising:
a liquid crystal cell having:
cell walls having alignment surfaces;
a liquid crystal material in contact with the cell walls;
an electrode structure having:
a plurality of capacitively coupled electrode segments separated by at least one insulating layer, and providing a transparent aperture;
an opposed electrode;
wherein an electric field can be provided between the electrode segments and the opposed electrode within the liquid crystal cell;
wherein a voltage applied to a first segment of the plurality of segments induces a reduced voltage in one or more subsequent capacitively coupled segments of said plurality of segments;
wherein the arrangement of said segments corresponds to a desired electric field spatial profile across an aperture of the liquid crystal cell; and
wherein said first segment for receiving said voltage comprises one of:
a butterfly shaped connected transparent electrode partially overlapping each other electrode segment, said partial overlap varying gradually with aperture position; and
a first Maltese-cross shaped connected transparent electrode partially overlapping each other electrode segment.

27. A device as claimed in claim 26, wherein said electrode structure comprises a second Maltese-cross oriented complementary to said first Maltese-cross.

28. A device as claimed in claim 26, wherein said optical device is a cylindrical lens, said electrode structure comprising strips of substantially parallel electrode segments and said first capacitively coupled electrode segment comprising outer ones of said parallel electrode segment strips.

29. A device as claimed in claim 26, wherein said optical device is a liquid crystal lens, said electrode structure comprising a substantially circular aperture and said plurality of capacitively coupled electrode segments comprising a plurality of substantially concentric capacitively coupled electrode segments.

30. A device as claimed in claim 29, wherein each capacitively coupled electrode segment further comprises circumferential subsegments for providing wavefront control via said optical device, preferably further comprising a controller configured to provide time-varying adjusted voltages to said subsegments for optical image stabilization.

31. A device as claimed in claim 26, wherein said plurality of capacitively coupled electrode segments are divided into first segments and second segments separated on two layers separated by one of: an insulation layer and a high dielectric constant layer, applied over said first plurality of capacitively coupled electrode segments.

32. A device as claimed in claim 31, wherein each electrode segment of the second plurality partially overlap adjacent electrode segments of the first plurality thereof.

33. A device as claimed in claim 31, wherein said electrode structure comprises one of:
a dielectric substrate over a substantially flat transparent electrically conductive electrode layer; and
an insulation layer over a substantially flat transparent conductive electrode layer.

34. A device as claimed in claim 33, wherein said substantially flat transparent electrically conductive layer further comprises a hole patterned electrode and a disc shaped electrode within the hole patterned electrode for bipolar operation of said optical device.

35. A device as claimed in claim 26, comprising two said liquid crystal cells arranged to act on both linear polarizations of light, said electrode structure being arranged to provide said desired electric field spatial profile across the aperture of said two liquid crystal cells.

36. A device as claimed in claim 35, comprising four said liquid crystal cells arranged to provide two cells having parallel liquid crystal orientation directions of opposed direction for each of said linear polarizations.

37. A device as claimed in claim 36, wherein said electrode structure is arranged on an inside of said cell walls, and is separately provided for each of said four liquid crystal cells.

38. A device as claimed in claim 36, wherein each of said two cells having parallel liquid crystal orientation directions of opposed direction are separated by a thin stretched membrane and share a common said electrode structure arranged on an inside of said cell walls.

39. A device as claimed in claim 26, further comprising an electrode covering at least a central part of said aperture for creating an electric field separately from said electrode segments.

40. A device as claimed in claim 26, wherein said insulating layer provides a small amount of conductivity and allows said desired electric field spatial profile to be essentially controlled as a function of a frequency of a control signal applied to said first segment of the plurality of segments.

41. A device as claimed in claim 26, further comprising a drive signal controller configured to provide at least one variable electrical signal of a predetermined voltage and frequency selected according to a desired variable optical property of the device, wherein preferably frequency is used to control an optical property of the device.

42. A device as claimed in claim 26, wherein the device is a tunable lens.

43. A device as claimed in claim 26, wherein said device has a flat, planar geometry.

44. A device as claimed in claim 35, wherein said electrode structure is arranged on an inside of said cell walls, and is separately provided for each of said two liquid crystal cells.

45. A device as claimed in claim 26, wherein the device includes a pattern of liquid crystal elements providing beam shaping.

46. A device as claimed in claim 28, wherein the device includes a pattern of liquid crystal elements providing beam shaping.

47. A device as claimed in claim 46, wherein the beam steering device further comprises a variable aggregate clear aperture including selectively controlled intermediate electrode segments across the aggregate clear aperture wherein at least one liquid crystal prism element is configured to include adjacent pairs of driven first segments.

48. A device as claimed in claim 46, wherein the beam shaping device further comprises a variable aggregate clear aperture including one of transparent and light absorbing liquid crystal cell walls between adjacent liquid crystal prism elements to mitigate sharp voltage drop differences between said adjacent liquid crystal prism elements providing operation at increased beam deviation angles.

* * * * *